United States Patent
Shorb

(10) Patent No.: US 11,099,899 B2
(45) Date of Patent: Aug. 24, 2021

(54) ATOMIC POOL MANAGER FOR A DATA POOL USING A MEMORY SLOT FOR STORING A DATA OBJECT

(71) Applicant: SAS Institute Inc., Cary, NC (US)

(72) Inventor: Charles S. Shorb, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/838,441

(22) Filed: Apr. 2, 2020

(65) Prior Publication Data
US 2021/0149731 A1    May 20, 2021

Related U.S. Application Data

(60) Provisional application No. 62/935,340, filed on Nov. 14, 2019.

(51) Int. Cl.
*G06F 9/50*        (2006.01)
*G06F 9/48*        (2006.01)

(52) U.S. Cl.
CPC .......... *G06F 9/5016* (2013.01); *G06F 9/4843* (2013.01); *G06F 2209/5011* (2013.01)

(58) Field of Classification Search
None
See application file for complete search history.

(56) References Cited

U.S. PATENT DOCUMENTS

| | | | | |
|---|---|---|---|---|
| 5,265,245 | A * | 11/1993 | Nordstrom | G06F 9/52 |
| 6,487,564 | B1 * | 11/2002 | Asai | G06F 16/40 |
| | | | | 715/201 |
| 7,380,073 | B2 | 5/2008 | Shorb | |
| 8,572,617 | B2 | 10/2013 | Shorb | |
| 9,213,586 | B2 | 12/2015 | Shorb | |
| 10,459,849 | B1 | 10/2019 | Shorb et al. | |
| 2005/0050528 | A1 * | 3/2005 | Wang | G06F 9/45516 |
| | | | | 717/148 |
| 2005/0149928 | A1 * | 7/2005 | Jiang | G06F 9/4843 |
| | | | | 718/100 |

(Continued)

OTHER PUBLICATIONS

Chynoweth, Michael, et al., Implementing Scalable Atomic Locks for Multi-Core Intel® EM64T and IA32 Architectures, https://software.intel.com/en-us/articles/implementing-scalable-atomic-locks-for-multi-core-intel-em64t-and-ia32-architectures/ (viewed Mar. 30, 2020).

*Primary Examiner* — Meng Ai T An
*Assistant Examiner* — Zujia Xu
(74) *Attorney, Agent, or Firm* — Coats + Bennett, PLLC

(57) ABSTRACT

A computing device receives, from a thread of a multi-thread application, a release message. Each of the threads indicates operation(s) on a memory associated with the application. The release message indicates that a data object used by the thread is released. The device indicates that a memory slot of a data pool is unlocked permitting storage of an indication of a location of the data object in the memory. Each memory slot of the data pool is individually lockable such that a locked memory slot of the data pool indicates storing a location in the locked memory slot will not be permitted even though storing the location in an unlocked memory slot of the data pool will be permitted. The device stores, in the memory slot of the data pool, an indication of a location of the data object. The data object comprises the location of the memory slot.

34 Claims, 21 Drawing Sheets

(56) References Cited

U.S. PATENT DOCUMENTS

| | | | |
|---|---|---|---|
| 2007/0198998 A1* | 8/2007 | Chen | G06F 12/126 |
| | | | 719/328 |
| 2008/0034169 A1* | 2/2008 | Trask | G06F 7/785 |
| | | | 711/154 |
| 2008/0229036 A1* | 9/2008 | Maeda | G06F 12/0802 |
| | | | 711/161 |
| 2010/0325235 A1* | 12/2010 | Konno | H04L 67/12 |
| | | | 709/214 |
| 2017/0099359 A1* | 4/2017 | Bejerasco | G06F 21/6263 |
| 2018/0032555 A1* | 2/2018 | Harrison | G06F 16/289 |
| 2018/0067857 A1* | 3/2018 | Wang | G06F 9/45558 |
| 2018/0203724 A1* | 7/2018 | Driever | G06F 9/4843 |
| 2019/0124174 A1* | 4/2019 | Wu | G06F 16/00 |
| 2019/0266084 A1* | 8/2019 | Rose | G06F 12/0646 |

* cited by examiner

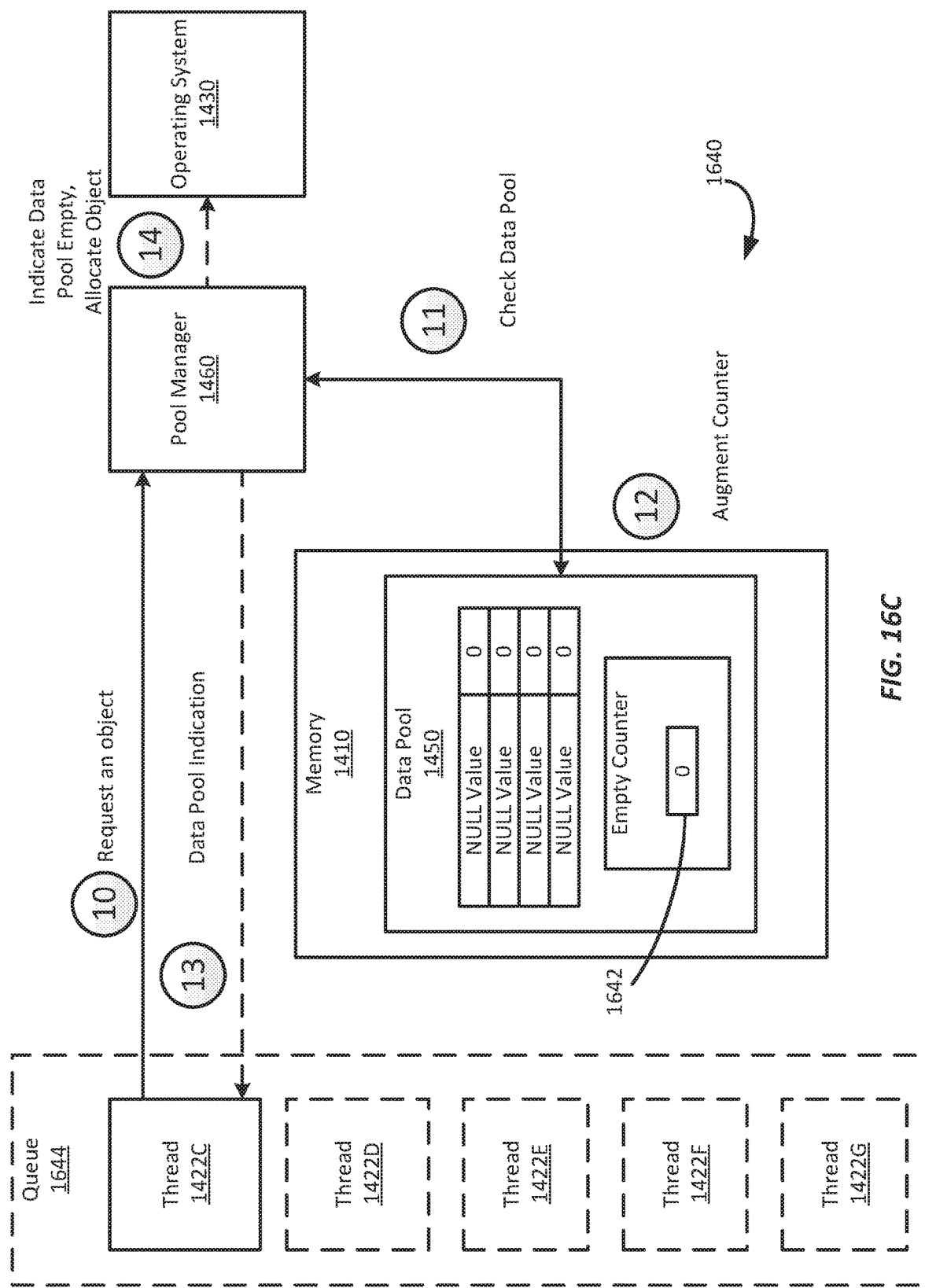

| Test | stack | pool-2 - spin(0x5c) | Compared to Stack |
|---|---|---|---|
| 1,000,000,000 iters, 1 thread | 37018283.85 | 36211056.14 | -2.18% |
| 100,000,000 iters, 4 threads | 4809626.22 | 6888557.2 | 43.22% |
| 10,000,000 iters, 8 threads | 3500100.28 | 6093070.59 | 74.08% |
| 10,000,000 iters, 16 threads | 4044358.73 | 5908938.38 | 46.10% |
| 10,000,000 iters, 32 threads | 3500110.5 | 6014088.45 | 71.83% |
| 10,00,000 iters, 64 threads | 3428132.24 | 6168798.19 | 79.95% |

1810, 1812, 1814, 1816 → 1800

| Test | stack | pool-2 - spin(0x2c) | Compared to Stack |
|---|---|---|---|
| 1,000,000,000 iters, 1 thread | 37127456.14 | 36233311.07 | -2.41% |
| 100,000,000 iters, 4 threads | 4951819.17 | 6924223.31 | 39.83% |
| 10,000,000 iters, 8 threads | 3252367.01 | 5638574.96 | 73.37% |
| 10,000,000 iters, 16 threads | 3032305.44 | 6141331.3 | 102.53% |
| 10,000,000 iters, 32 threads | 3009703.86 | 6473840.36 | 115.10% |
| 10,00,000 iters, 64 threads | 3272886.08 | 6206735 | 89.64% |

1830, 1832, 1834, 1836 → 1820

| Test | stack | pool-4 - spin(0x2c) | Compared to Stack |
|---|---|---|---|
| 1,000,000,000 iters, 1 thread | 37224634.03 | 36245277.74 | -2.63% |
| 100,000,000 iters, 4 threads | 4910077.94 | 7467845.23 | 52.09% |
| 10,000,000 iters, 8 threads | 3282586.85 | 6877326.93 | 109.51% |
| 10,000,000 iters, 16 threads | 3579058.09 | 7270410.85 | 103.14% |
| 10,000,000 iters, 32 threads | 3409889.22 | 7002933.22 | 105.37% |
| 10,00,000 iters, 64 threads | 3494792.51 | 6848299.77 | 95.96% |

1850, 1852, 1854, 1856 → 1840

| Test | stack | pool-4 - spin(0x0c) | Compared to Stack |
|---|---|---|---|
| 1,000,000,000 iters, 1 thread | 37220002.3 | 36321269.91 | -2.41% |
| 100,000,000 iters, 4 threads | 4716648.3 | 7475408.71 | 58.49% |
| 10,000,000 iters, 8 threads | 3252986.85 | 6937262.93 | 113.26% |
| 10,000,000 iters, 16 threads | 2848109.86 | 9835188.85 | 245.32% |
| 10,000,000 iters, 32 threads | 2865956.9 | 9670016.43 | 237.41% |
| 10,00,000 iters, 64 threads | 3023723.51 | 9232436.84 | 205.33% |

ATOMIC POOL MANAGER FOR A DATA POOL USING A MEMORY SLOT FOR STORING A DATA OBJECT

RELATED APPLICATIONS

This application claims the benefit of U.S. Provisional Application No. 62/935,340, filed Nov. 14, 2019, the disclosure of which is incorporated herein by reference in their entirety.

BACKGROUND

When a computing device allocates a memory location to an application for use for storing a data object, it may be beneficial when the application is finished with the data object to refrain from destroying that released data object. Traditional approaches to storing released data objects used an atomic stack to store released objects.

SUMMARY

In an example embodiment, a computer-program product tangibly embodied in a non-transitory machine-readable storage medium is provided. The computer-program product includes instructions operable to cause a computing device to receive, from a first thread of an application with multiple threads, a first release message. Each of the multiple threads indicates one or more operations on a memory associated with the application. The first release message indicates that a first data object used by the first thread in one or more operations according to the first thread is released from use by the first thread. The first data object is stored in the memory associated with the application. The computer-program product includes instructions operable to cause a computing device to indicate that a memory slot of a data pool is unlocked permitting storage of an indication of a location of the first data object in the memory associated with the application. The memory slot is one of a plurality of memory slots in the data pool. The data pool is in the memory associated with the application. Each memory slot of the data pool is individually lockable such that a respective locked memory slot of the data pool indicates storing a given data object's location in the respective locked memory slot will not be permitted even though storing the given data object's location in an unlocked memory slot of the data pool will be permitted. The computer-program product includes instructions operable to cause a computing device to store, in the memory slot of the data pool, an indication of a location of the first data object in the memory associated with the application. The first data object comprises the location of the memory slot of the data pool.

In another example embodiment, a computing device is provided. The computing device includes, but is not limited to, a processor and memory. The memory contains instructions that when executed by the processor control the computing device to store, in a memory slot of a data pool, an indication of a location of a data object in memory associated with an application.

In another example embodiment, a method of storing, in a memory slot of a data pool, an indication of a location of a data object in memory associated with an application.

Other features and aspects of example embodiments are presented below in the Detailed Description when read in connection with the drawings presented with this application.

BRIEF DESCRIPTION OF THE DRAWINGS

FIG. 16C illustrates an example flow diagram for requesting an object in at least one embodiment of the present technology.

FIG. 18 illustrates data processing improvements in embodiments of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
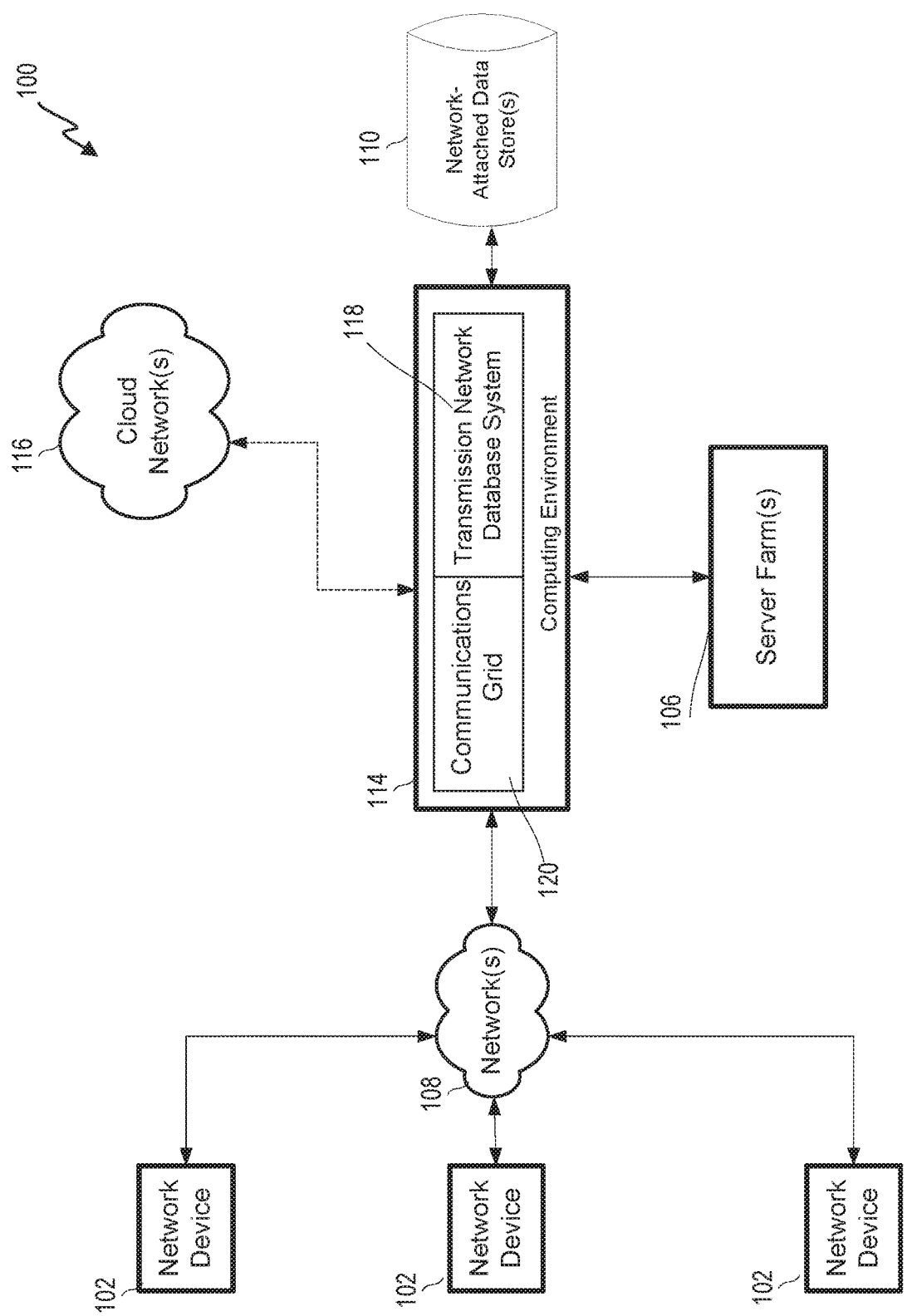
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
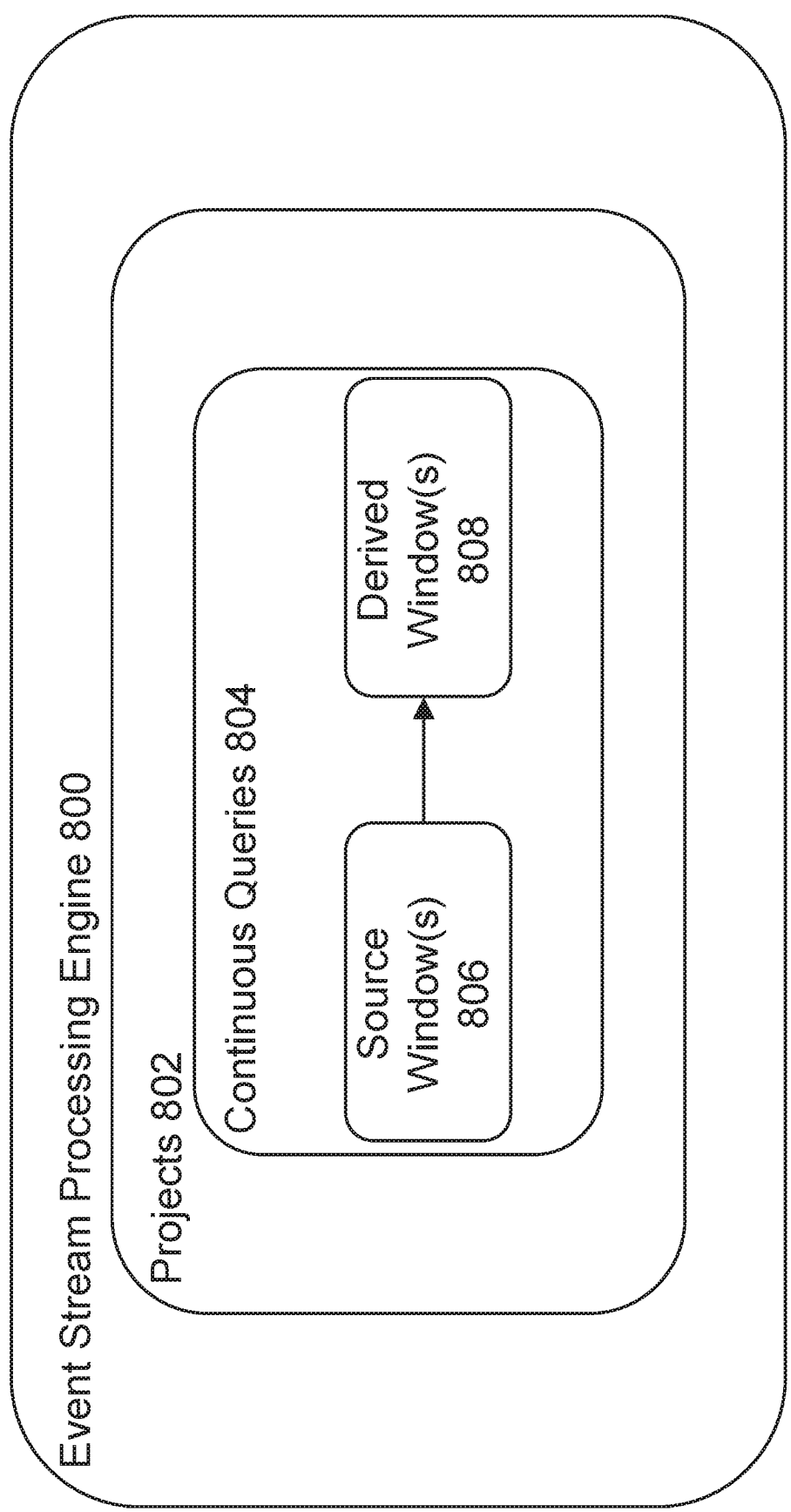
FIG. 8 illustrates a block diagram including components of an Event Stream Processing Engine (ESPE), according to at least one embodiment of the present technology.
Figure 9:
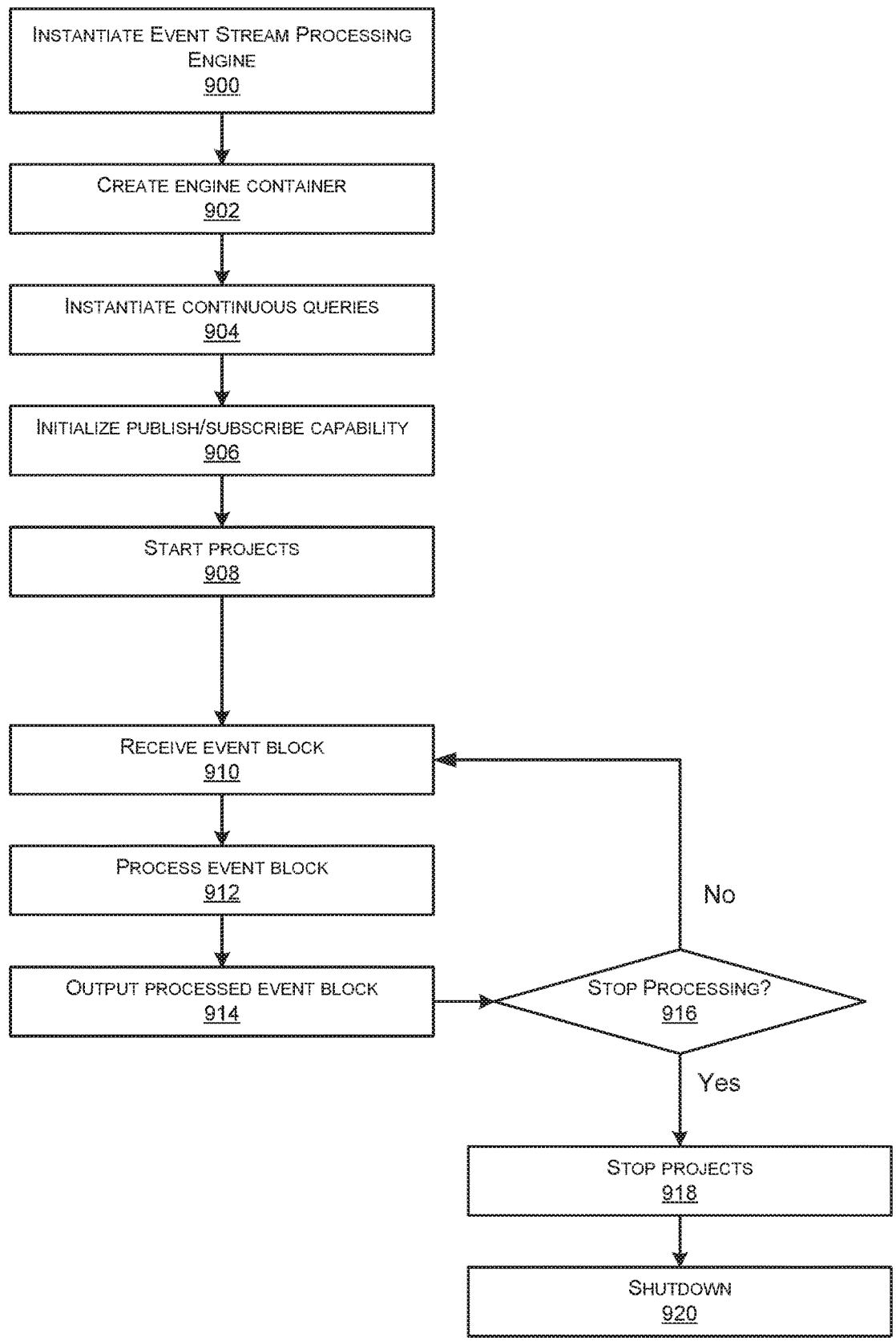
FIG. 9 illustrates a flow chart showing an example process including operations performed by an event stream processing engine, according to at least one embodiment of the present technology.
Figure 10:
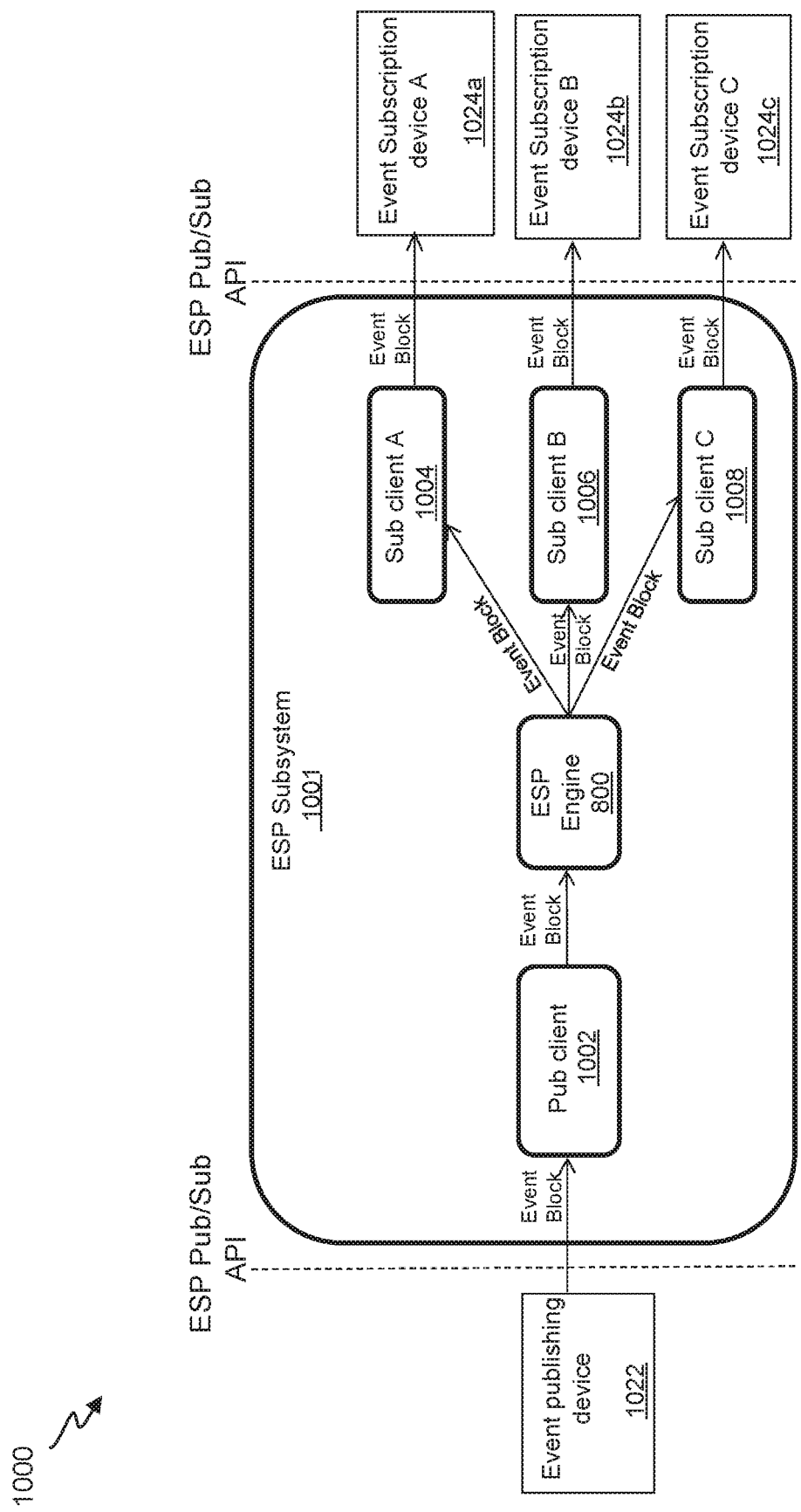
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
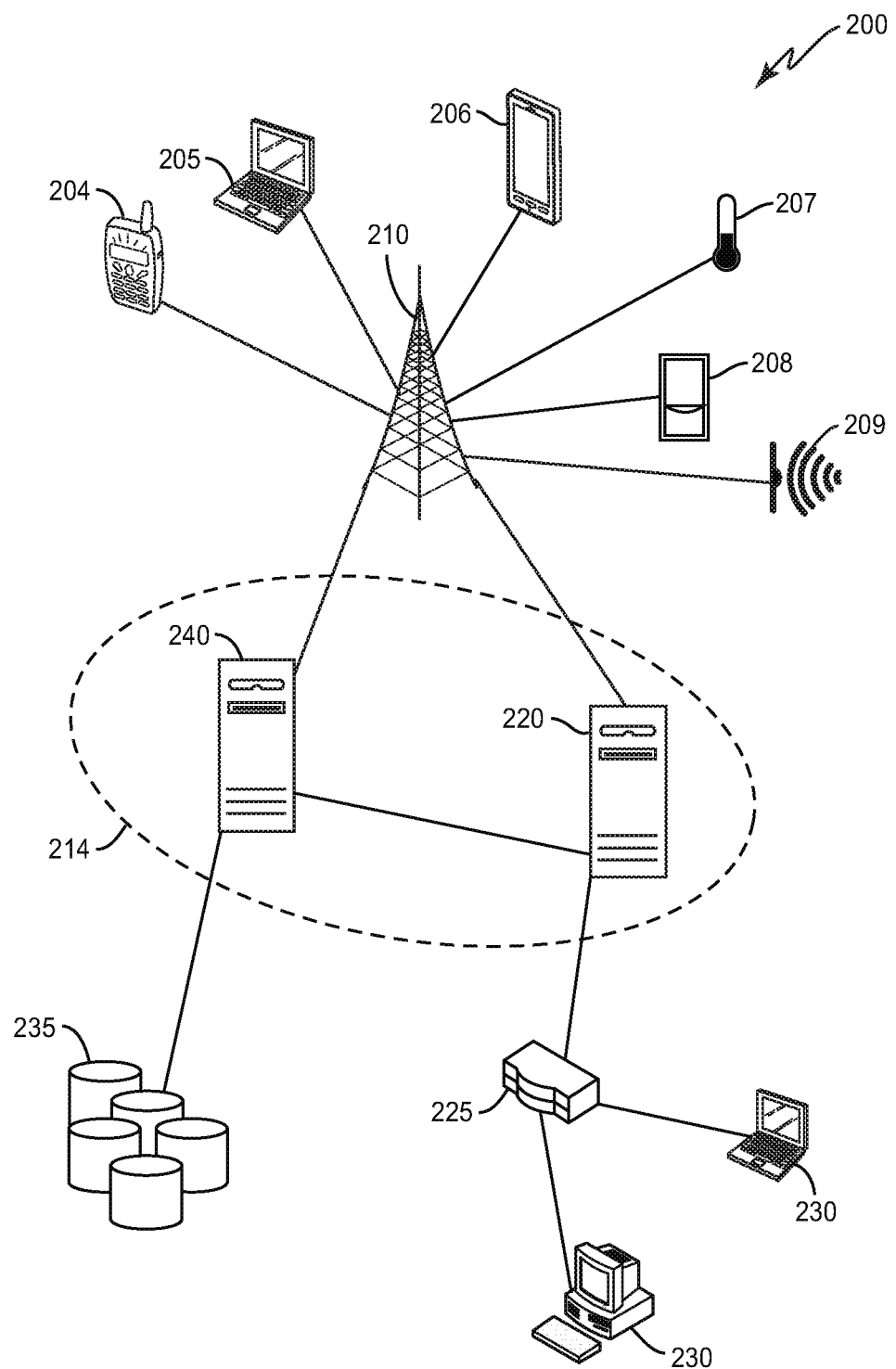
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
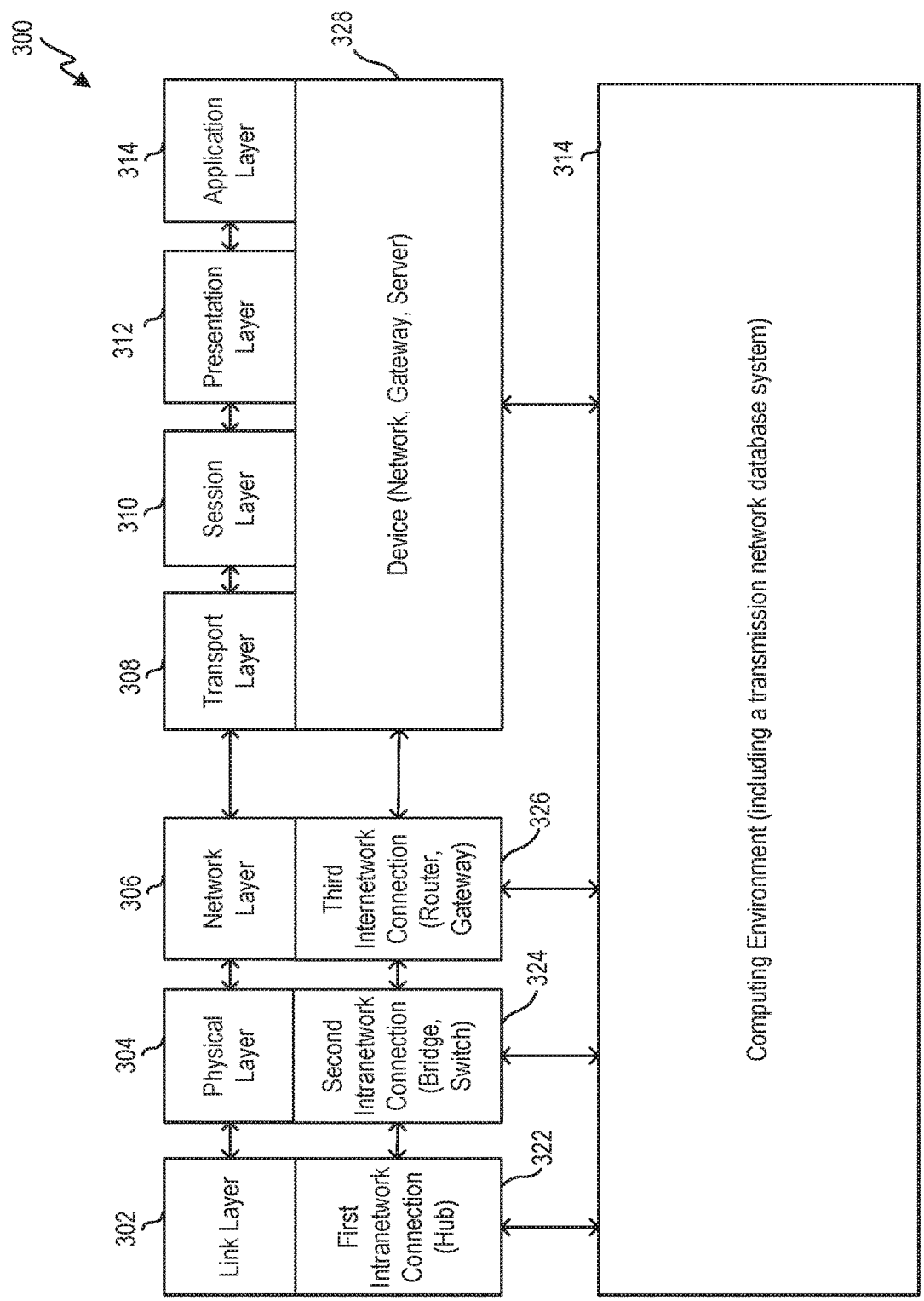
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
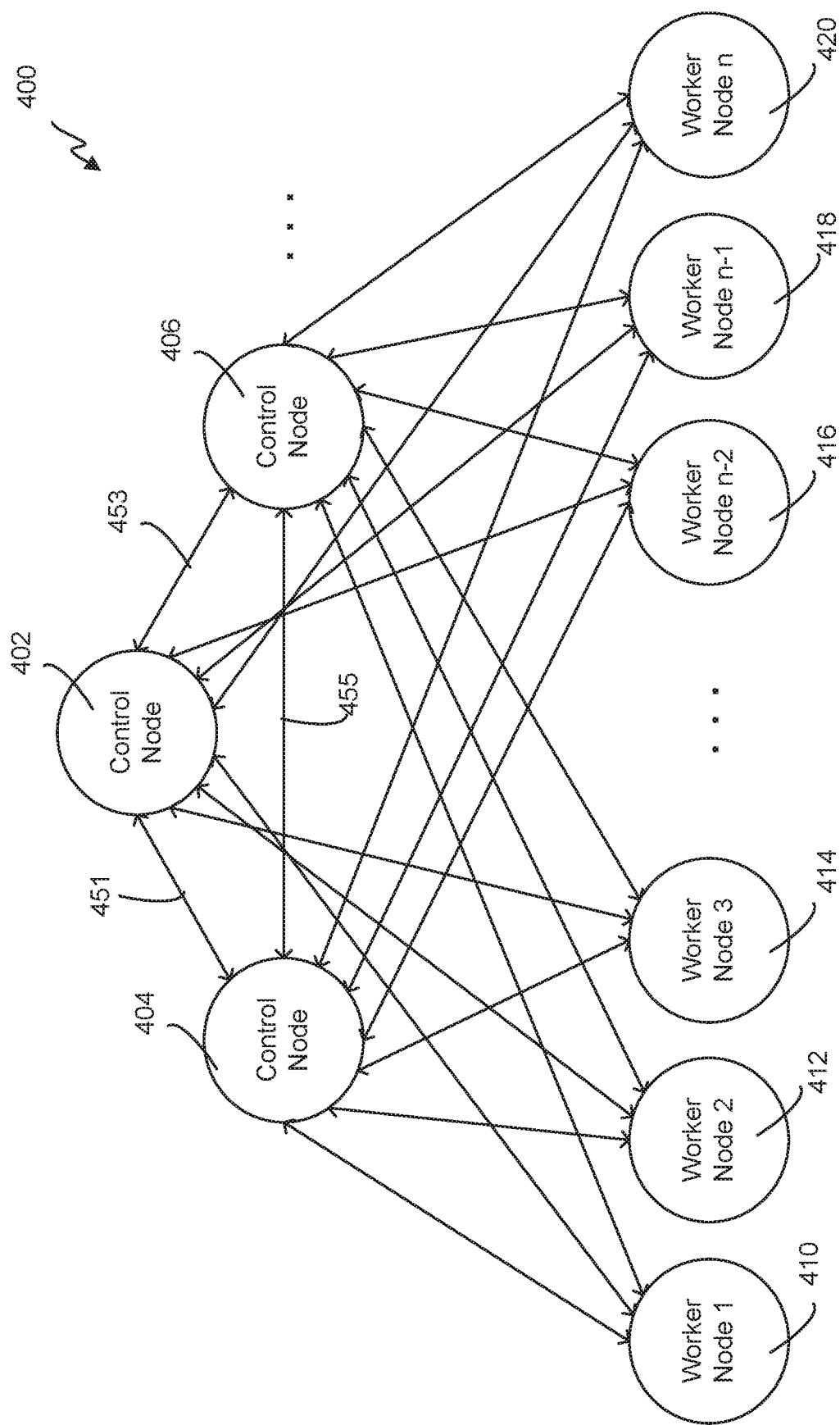
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
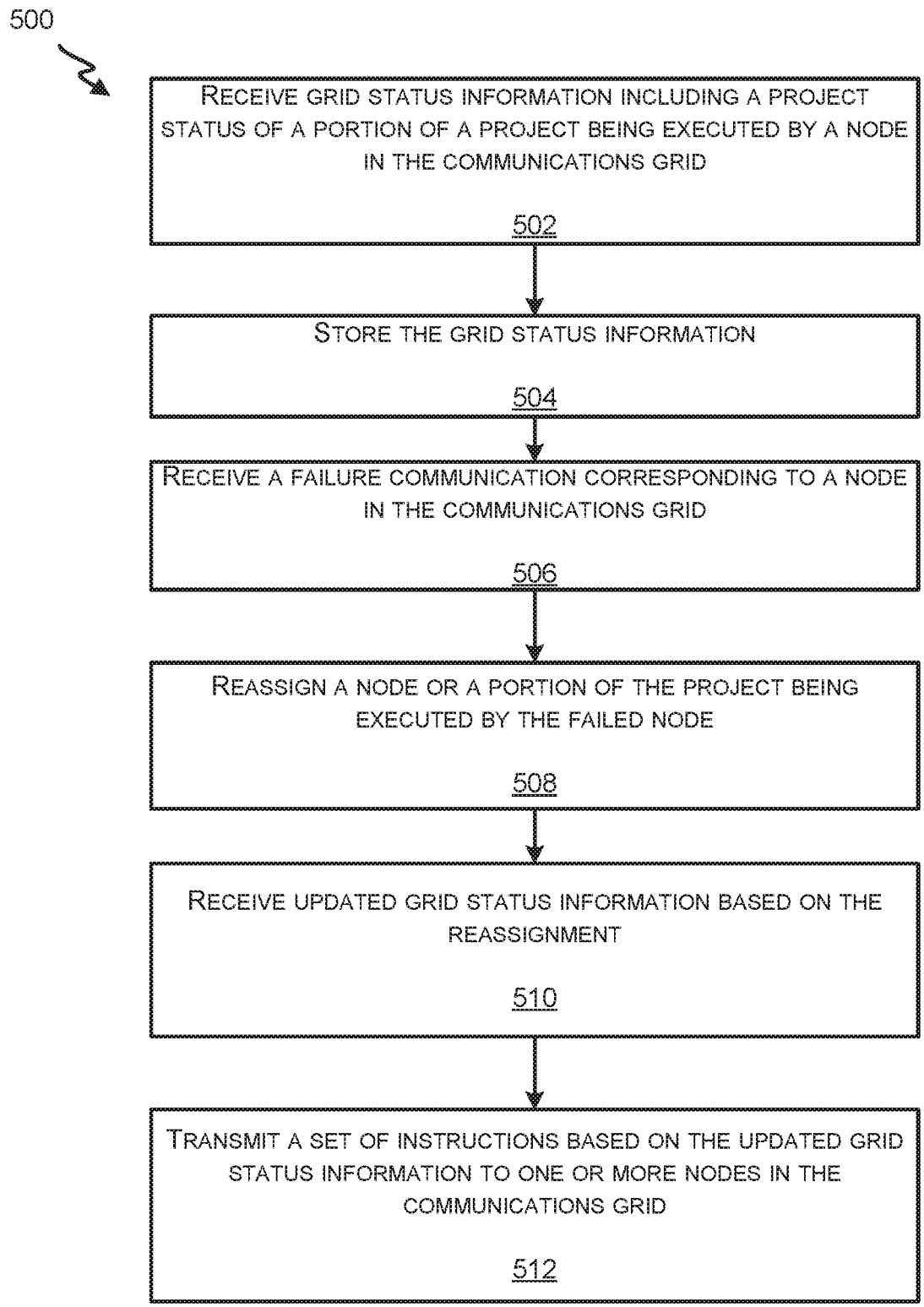
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
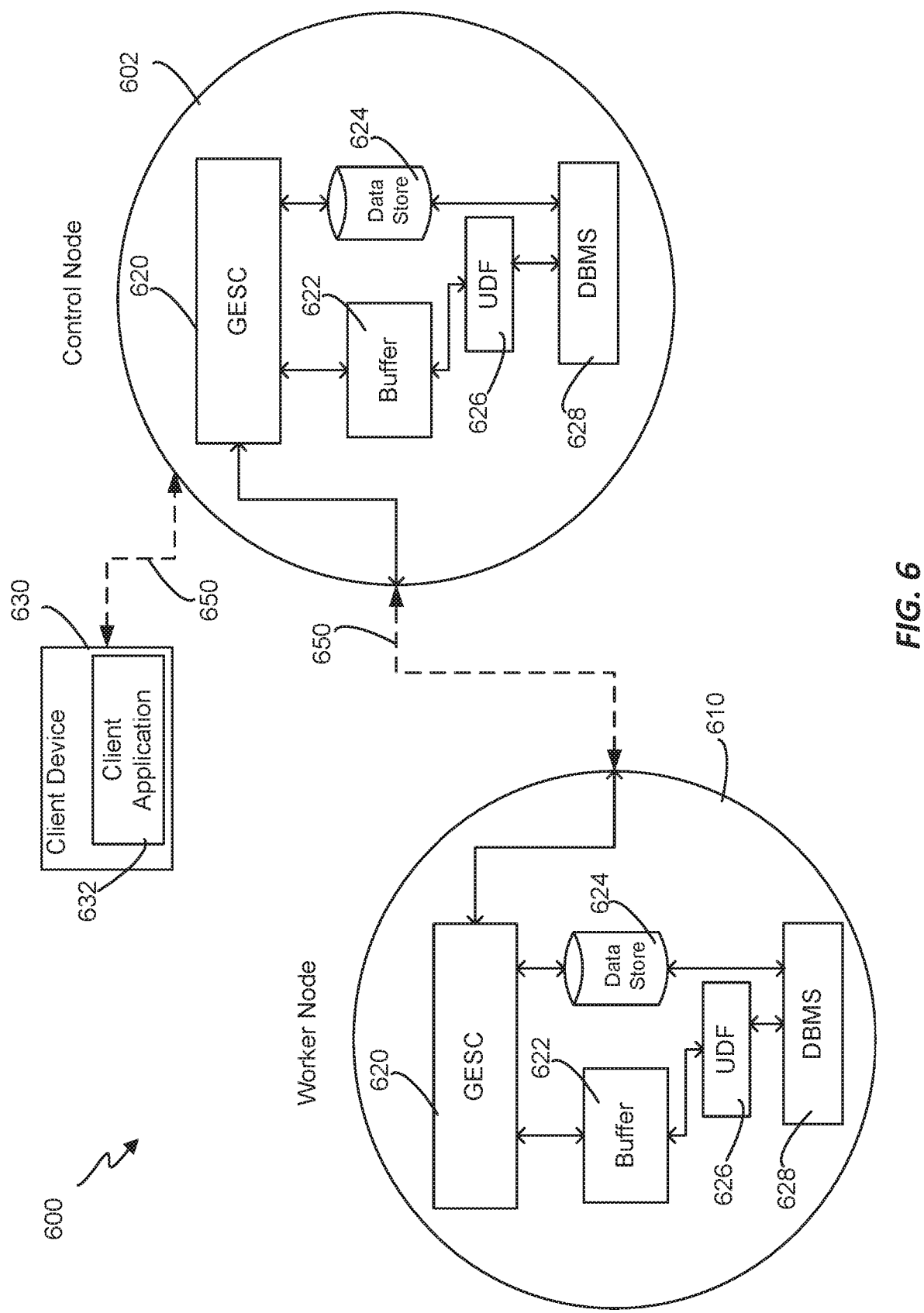
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
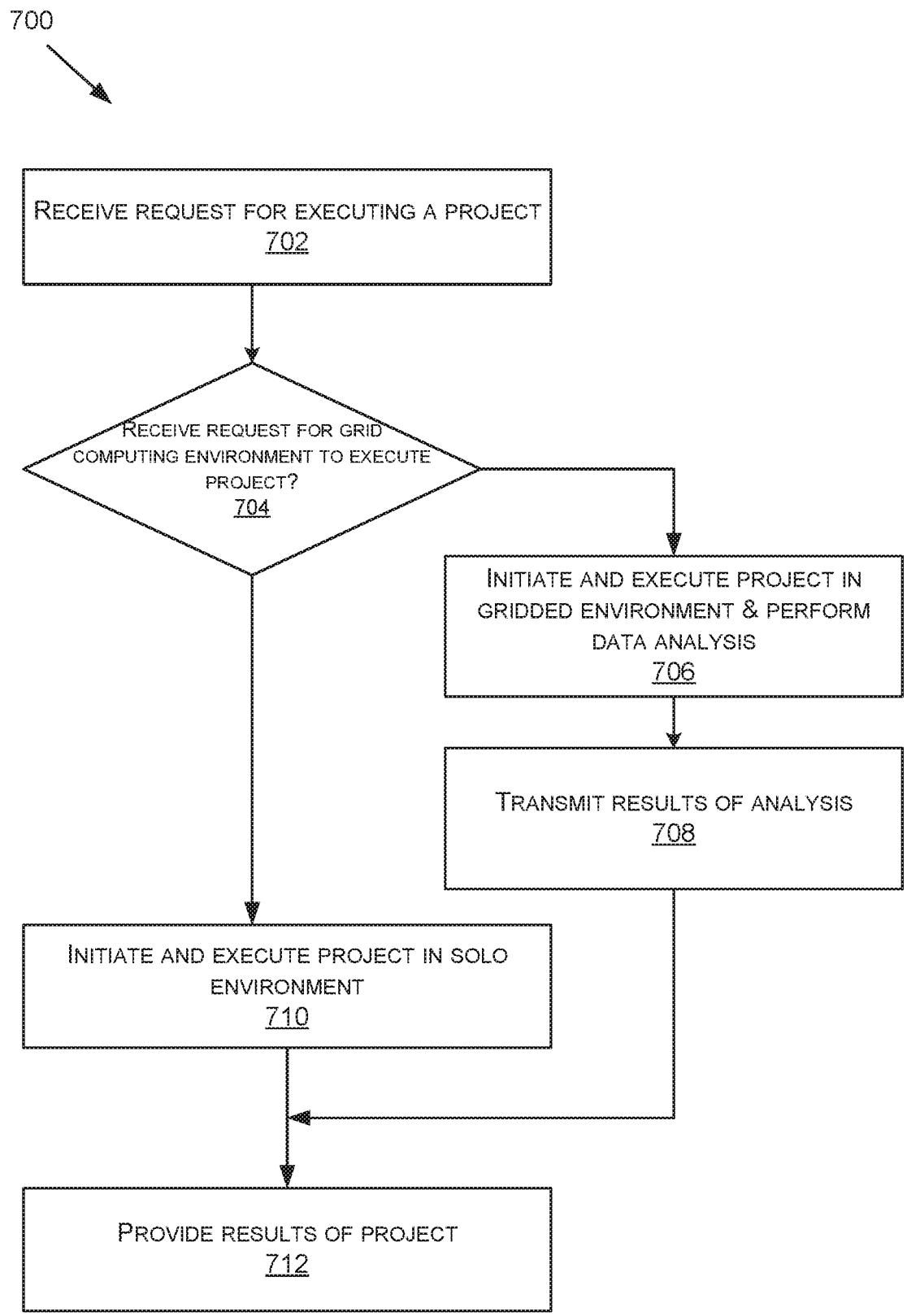
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
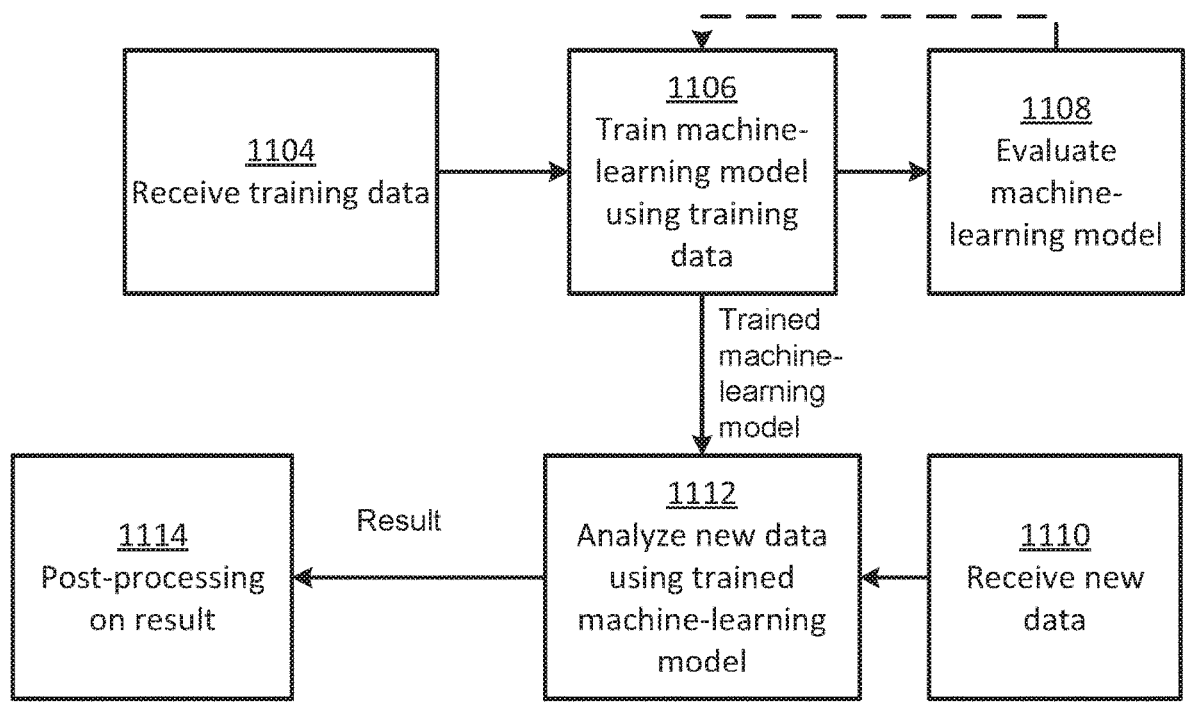
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
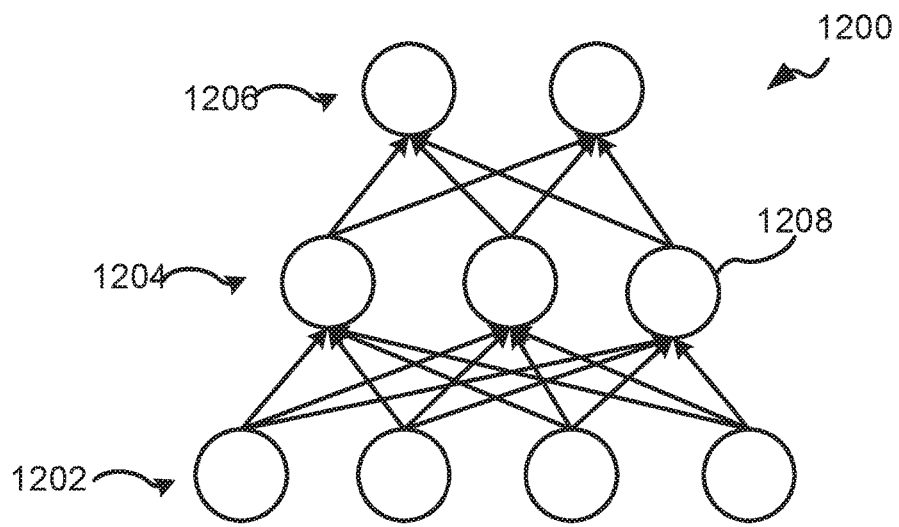
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
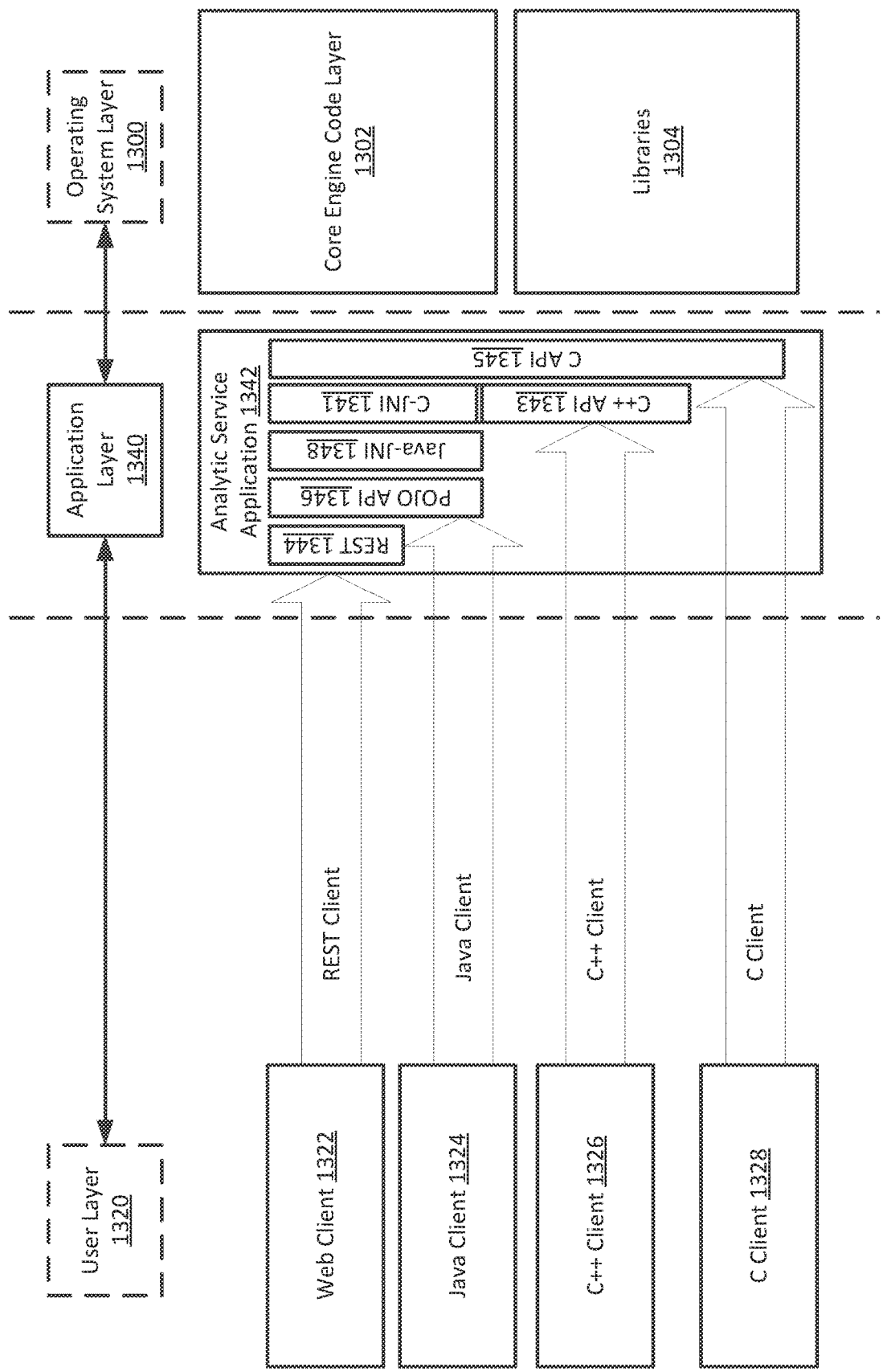
FIG. 13 illustrates an example layered architecture in at least one embodiment.

FIG. 13 illustrates an example layered architecture for a computing device or system comprising an operating system layer 1300, user layer 1320, and an application layer 1340. The operating system layer 1300 comprises a core engine layer 1302 (e.g., a Micro Analytic Service Core) and one or more libraries 1304 (e.g., SAS® Threaded Kernel Libraries, IBM® Libraries or Oracle® libraries). A Micro Analytic Service Core is an example of a multi-threaded service. A thread represents or otherwise identifies a series of one or more operations according to programed instructions of a process. A process or multiple processes can have multiple threads that each concurrently use a common memory (e.g., a database) to execute an operation.

In one or more embodiments, an application defined by the user layer 1320 or application layer 1340 may define operations in a data object-oriented programming language that requires storing objects in storage. For instance, the application layer 1340 includes one or more analytic service applications 1342 as an interface between the operating system layer 1300 and a user layer 1320. As shown in FIG. 13, the analytic service applications 1342 include a REpresentational State Transfer (REST) application programming interface (API) layer 1344, a Java plain old Java object (POJO) API (POJO API) layer 1346, and a Java-Java native interface (Java-JNI) layer 1348 written in the Java programming language. Analytic service application 1342 further includes a C++ API layer 1343, a C-JNI layer 1341, and a C API layer 1345.

In the user layer 1320, clients, e.g., Web clients 1322 (REST clients), Java clients 1324, C++ clients 1326 (e.g., ESP as described above), C clients 1328, may implement various applications that interface with analytic service applications 1342 (e.g., an analytic creation application or an analytic execution application). For instance, Java clients 1324 can integrate with the POJO API layer 1346. The POJO API layer may communicate with the core engine code layer 1302 in-process through the Java-JNI layer 1348. Web clients 1322 may interface with the REST API layer that provides persistence and clustering for scalability and high availability. For example, an analytic creation application may be implemented using the SAS® Enterprise Decision Manager that generates programs that implement user-created rule sets and rule flows. The programs may be in a programming language provided by SAS Institute, Inc. of Cary, N.C. (e.g., DS2). SAS® Enterprise Decision Manager can combine analytics, such as score code generated by SAS® Enterprise Miner, with business rules to form decision logic. Analytic service application 1342 is used to compile and execute the generated score code provided as an input.

Clients may use different transport protocols, e.g., Web clients 1322 may use HyperText Transfer Protocol (HTTP), Simple Network Management Protocol (SNMP), Simple Mail Transport Protocol (SMTP), etc.

The REST API layer 1344 handles certain functionality automatically, such as initialization and user context management. The POJO API layer 1346 and C API layer 1345 provide methods to control these elements directly.

Some layers are positioned between the REST API layer 1344 and the C API layer 1345 (e.g., Java-JNI layer 1348). Interface layers may be strictly one-way such that the C API layer 1345 does not depend on the REST API layer 1344, the POJO API layer 1346, or the Java-JNI layer 1348. C clients 1328 can omit the Java layers altogether. The POJO API layer 1346 communicates with the core engine layer 1302 strictly through the C API layer 1345 but does not depend on the REST API layer 1344. Similarly, the REST API layer 1344 communicates with the core engine layer 1302 strictly through the POJO API layer 1346 and the Java-JNI layer 1348.

Analytic service application 1342 may be deployed as a web application executing on one or more Web application servers implemented using Base SAS®. The REST API layer 1344 provides an interface for web client applications to compile and execute source code into operations (method, subroutines, functions) that provide near real-time analytic capabilities. An operation is a set of instructions designed to perform a predefined operation within a program. The REST API layer 1344 supports the execution of DS2 source code and provides the ability to run SAS® Enterprise Miner score code (possibly converted from a SAS® DATA step operation to DS2) as well as user-written functions.

For illustration, the REST API layer 1344 may provide the following POST methods: 1) a create revision method that publishes source code in memory with a request body that contains DS2 source code as an input, 2) a validate revision method that validates the request body of input values required by the DS2 source code and returns validation results, and 3) an execute revision operation method that validates and executes the published source code with a request body of input values required by the DS2 source code. Source code is published and stored in analytic data. The REST API layer 1344 further may provide an update revision context PUT method that publishes updated source code in memory with a request body containing the DS2 source code as input.

The REST API layer 1344 further may provide a delete revision DELETE method that removes source code from memory. The REST API layer 1344 may provide the following GET methods: 1) an individual revision query method that returns detailed information about a revision, 2) a revision operations query method that returns a list of operations available in the published source code, 3) an individual revision operation query method that returns detailed information about the inputs required by the operation and the outputs produced by the step, 4) a retrieve revision details query method that returns information such as the name of the published source code, the revision number, and a list of compiled operations of the published source code. The REST API layer 1344 may support JSON resource representations. A "step" includes any of a method of the DS2 package, a subroutine of a C program, or a function of a Python script.

The POJO API layer 1346 supports similar functionality as the C API layer 1345. The POJO API layer 1346 allows tightly coupled Java client applications to interact with analytic service application 1342 directly through Java method calls by not hiding detailed functionality. In contrast, the REST API layer 1344, in the interest of simplicity, handles many interactions automatically. The POJO API layer 1346 enables client-supplied analytic source code programs and models to be published to analytic service application 1342 (e.g., DS2, Python, C, and ASTORE), where they are interpreted or compiled into modules and made available for repeated execution by storing in analytic data. The POJO API layer 136 also includes methods for querying information about currently loaded content, such as user contexts, modules, revisions, and operation signatures (input and output parameters). In one or more embodiments, a layered architecture as (e.g., an architecture described in FIG. 13) is implemented using a computing device or system as described herein.

An operating system layer may allocate a data object in response to execution of a data object-oriented program (e.g., one described herein). The operating system may allocate storage for that data object in association with different layers for efficiency in processing (e.g., having memory located physically near processing of instructions on that memory). After executing the program, an application or operating system may release the object, but for processing reasons, it may be beneficial not to destroy allocated memory.

Traditional approaches to storing released data objects used an atomic stack to store multiple released objects to cache for reuse. By using the atomic stack, the computing architecture increases throughput of use of released objects in lieu of using operating system locking to fully destroy an object and recreate it from scratch. The atomic stack is particularly helpful in a multi-thread environment where multiple threads may need to access a shared memory (e.g., to release or request data objects). However, an atomic stack implementation is susceptible to a serialization bottleneck.

For instance, in an atomic stack implementation, a Top-of-Stack (TOS) pointer is used to lock (e.g., augment a least significant bit setting) all objects in the stack when a thread accesses the stack. A lock is used to prevent multiple processes or threads from accessing a memory location at the same time. A lock protects the integrity/visibility of the underlying implementation. For instance, the lock ensures that the memory locations are not visible to other threads while the memory objects are changing. The implementation means other threads not accessing the stack are forced to spin until the thread that has locked the TOS unlocks (e.g., by completing a Pop( ) operation to pop an object out of the stack). A thread attempting to access an entry in the stack and holding the lock may not be currently running (e.g., it may have context switched out). During this time, no other thread could make further progress towards the goal of registering or deregistering its object into the underlying data store. Threads waiting for the unlocked state will wait for the duration of an allocated time (e.g., a time-quanta allocated by an operating system before a thread should go to sleep). If a particular thread is prioritized over other blocked threads, this will almost ensure that the blocked threads will exhaust their allocated time.

One or more embodiments herein may improve bottleneck problems associated with an atomic stack implementation.

Figure 14:
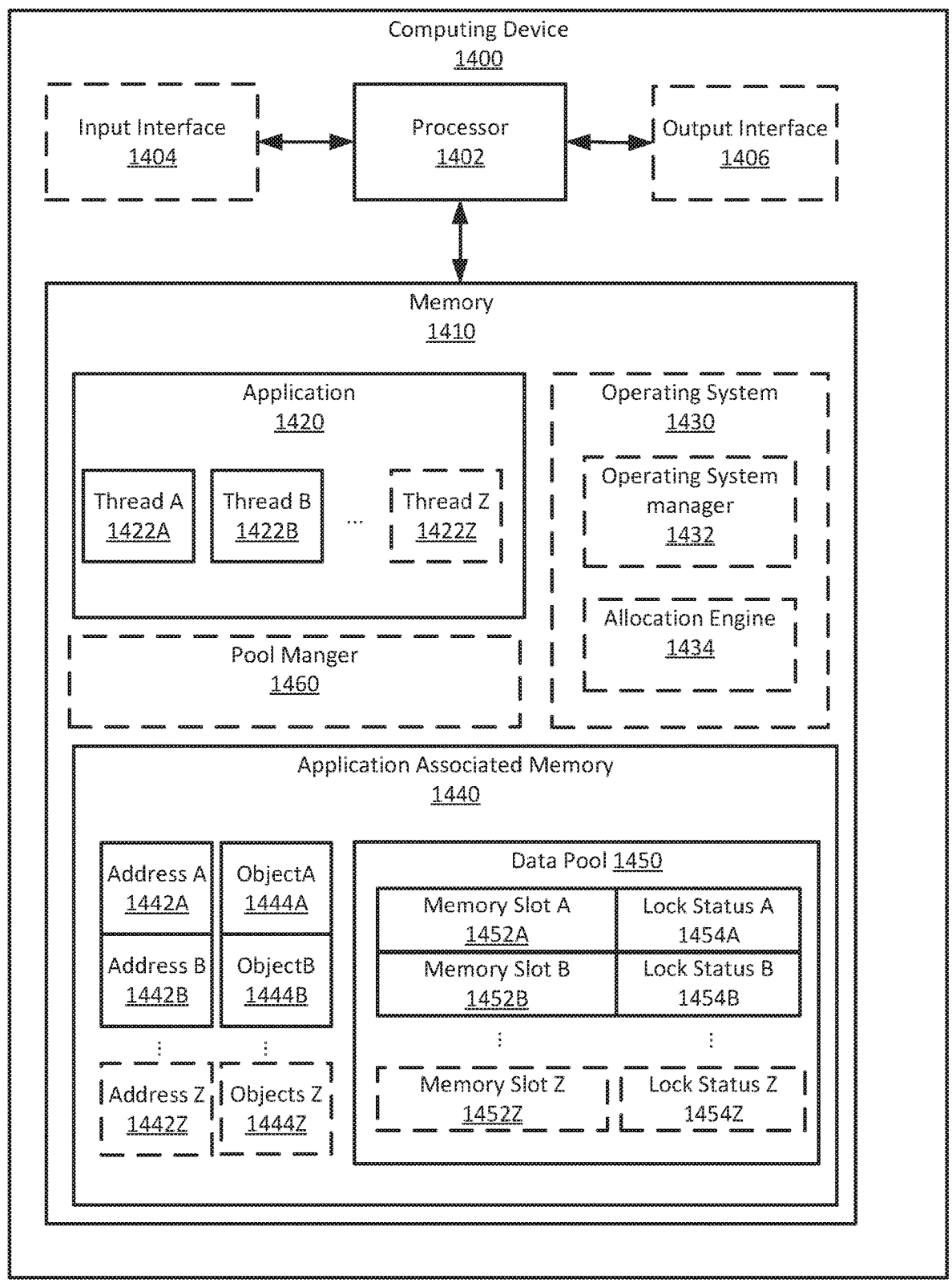
FIG. 14 illustrates a block diagram of a computing system in at least one embodiment of the present technology.

FIG. 14 illustrates a block diagram of a computing system 1400 (e.g., a computing device implementing a layer architecture described herein). The computing system 1400 comprises a memory 1410 and a processor 1402.

Memory 1410 is an electronic holding place or storage for information so the information can be accessed by processor 1402. Memory 1410 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc. Instructions stored in computer-readable medium can be implemented in software (e.g., computer-readable and/or computer-executable instructions) and accessible by processor 1402 for execution of the instructions. The applications can be written using one or more programming languages, assembly languages, scripting languages, etc. as described herein.

The memory 1410 or any component of the memory 1410 may be implemented as multiple memories or located in non-contiguous or contiguous memory regions. For instance, the application associated memory 1440 may be in a different memory location than memory associated with operating system 1430.

Processor 1402 executes instructions (e.g., stored in memory 1410). The instructions can be carried out by a special purpose computer, logic circuits, or hardware circuits. In one or more embodiments, processor 1402 is implemented in hardware and/or firmware. Processor 1402 executes an instruction, meaning it performs or controls the operations called for by that instruction. The term execution is the process of running an application or the carrying out of the operation called for by an instruction. The instructions can be written using one or more programming language (e.g., using clients as described herein), scripting language, assembly language, etc. Processor 1402, in one or more embodiments, can retrieve a set of instructions from a permanent memory device and copy the instructions in an executable form to a temporary memory device that is generally some form of RAM, for example. The processor 1402 may be implemented as multiple processors (e.g., multiple central processing units for parallel processing).

In one or more embodiments, computing system 1400 is part of a layered architecture (e.g., a layered architecture shown in FIG. 13). For instance, an operating system 1430 (e.g., operating system manager 1432) provides for the orderly control of resources in an operating system layer (e.g., operating system layer 1300) and by other layers (e.g., application 1420 in an applications layer 1340 or user layer 1320). For instance, the operating system 1430 may have an allocations engine 1434 for allocating one or more application associated memories for use by a particular application 1420 (e.g., application associated memory 1440). The application 1420 may include one or more threads 1422. Each of the threads may indicate one or more operations on a memory (e.g., application associated memory 1440). For example, the thread(s) 1422 may execute instructions for storing or operating on one or more data objects 1444 at memory locations 1442. In one or more embodiments, the thread(s) 1422 may release a data object from use (e.g., permanently or temporarily for threads of the application).

In one or more embodiments, the computing system 1400 is able to retain those memory locations 1442 for use by other data objects. These memory locations 1442 may be stored in an atomic stack. However, embodiments herein advantageously implement a data pool 1450. Unlike an atomic stack, the data pool 1450 can comprise multiple memory slots 1452 (also called pool entities) that are each individually lockable. A locked memory slot of the data pool indicates storing a data object's location in the locked memory slot will not be permitted even though storing the data object's location in an unlocked memory slot of the data pool will be permitted. For instance, as shown the memory slot 1452A may have a lock status 1454A (e.g., locked) that is different than the lock status 1454B associated with memory slot 1452B (e.g., unlocked).

In some implementations to access a shared memory slot in a data pool, a thread needs to acquire a lock indicating the resource is locked to other threads. A lock can be implemented in different ways. For instance, a thread accessing the memory holds a so called "spin lock". A spin lock causes another thread to wait in a loop "spin" while repeatedly checking to see if the spin lock is available. Since the thread waiting for the spin lock remains active but is not performing a useful operation, the spin lock is also referred to as busy waiting or a busy lock. Once acquired, spin locks will usually be held until they are explicitly released. In some implementations they can be automatically released if the thread that holds the spin lock "goes to sleep". Alternatively or additionally to a spin lock, access is prevented using a YIELD( ) operation or WAIT( ) operation. YIELD( ) keeps a thread active, placing it on the end of a ready-to-run list or queue. WAIT( ) places the thread on a busy list. In either case, a thread gives up its execution time to catch the small chances when the thread holding a spin lock loses its time quanta. When the thread loses its time quanta, it yields to other threads waiting for the same lock.

In one or more embodiments, a released object may be destroyed for use by the application (e.g., if the data pool 1450 is full or all the memory locations of the data pool 1450 are locked). The memory location may also be deallocated (e.g., so another application can use the memory location).

In one or more embodiments, one or more aspects of computing system 1400 (e.g., a pool manager 1460) may be used to manage the data pool 1450. For instance, the pool manager 1460 may receive, from a thread of an application (e.g., thread 1422A), a release message indicating a data object used by the thread in one or more operations according to the thread is released from use by the thread. The pool manager 1460 may indicate that a memory slot of a data pool is unlocked (e.g., memory slot 1452A) permitting storage of an indication of a location of the data object in the memory associated with the application (e.g., an indication of an address 1442A). The pool manager 1460 stores, in a memory slot of the data pool, an indication of a location of a released data object in the memory associated with the application. In one or more embodiments, the stored data object comprises the location of the memory slot of the data pool. For instance, the pool manager 1460 may store the location of the memory slot of the data pool with the first data object as a pointer to release the memory slot if the data object is retrieved. The pool manager 1460 may additionally be used to retrieve data objects or to make decisions on destroying an object (e.g., determining if data pool 1450 is full or empty).

The pool manager 1460 may be implemented by one or more layers of a computer architecture (e.g., an operating system layer 1300, an application layer 1340, and a user layer 1320). Consequently, the instructions for implementing the pool manager 1460 may be stored in any appropriate memory area (e.g., it may be stored within application associated memory 1440, memory associated with operating system 1430, in another memory location in a computing device, or elsewhere in a computing system). Further, the pool manager 1460 may be implemented as multiple components within the computing system 1400.

In one or more embodiments, computing system 1400 is a computing device, is a plurality of devices, or interacts with other devices not shown (e.g., input device, output devices or components of computing system 1400). In one or more embodiments, fewer, different, and additional components can be incorporated into computing system 1400. For instance, computing system 1400 could comprise an input interface 1404 for receiving data or an output interface 1406 for sending data. In embodiments described herein, computing device and system can be used interchangeably such that embodiments described with respect to a computing device could be implemented by a computing system, and vise versa.

Figure 15A:
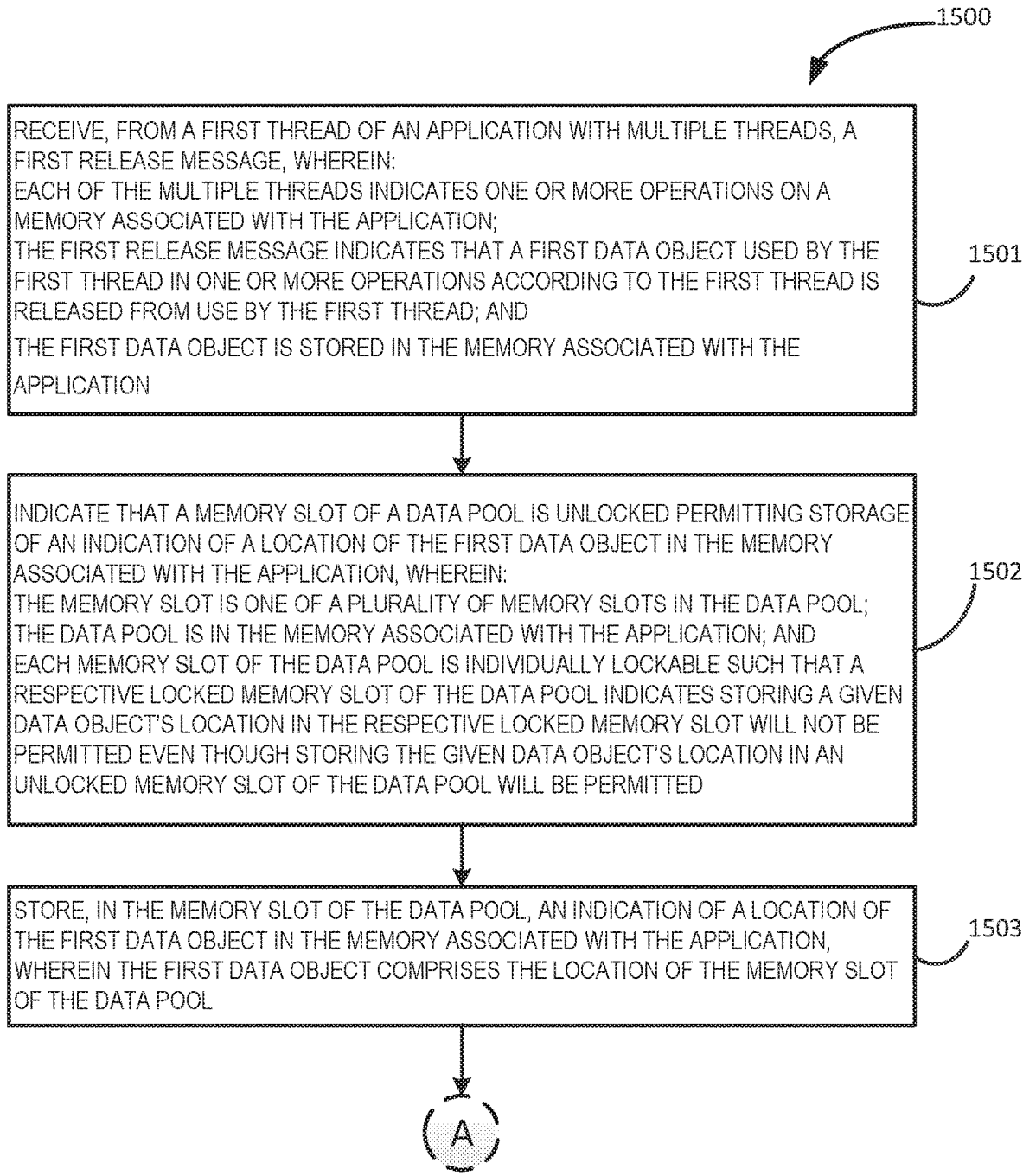
FIG. 15A illustrates a flow diagram for a method of storing an indication of a location of a data object in a multi-slot data pool in at least one embodiment of the present technology.
Figure 15B:
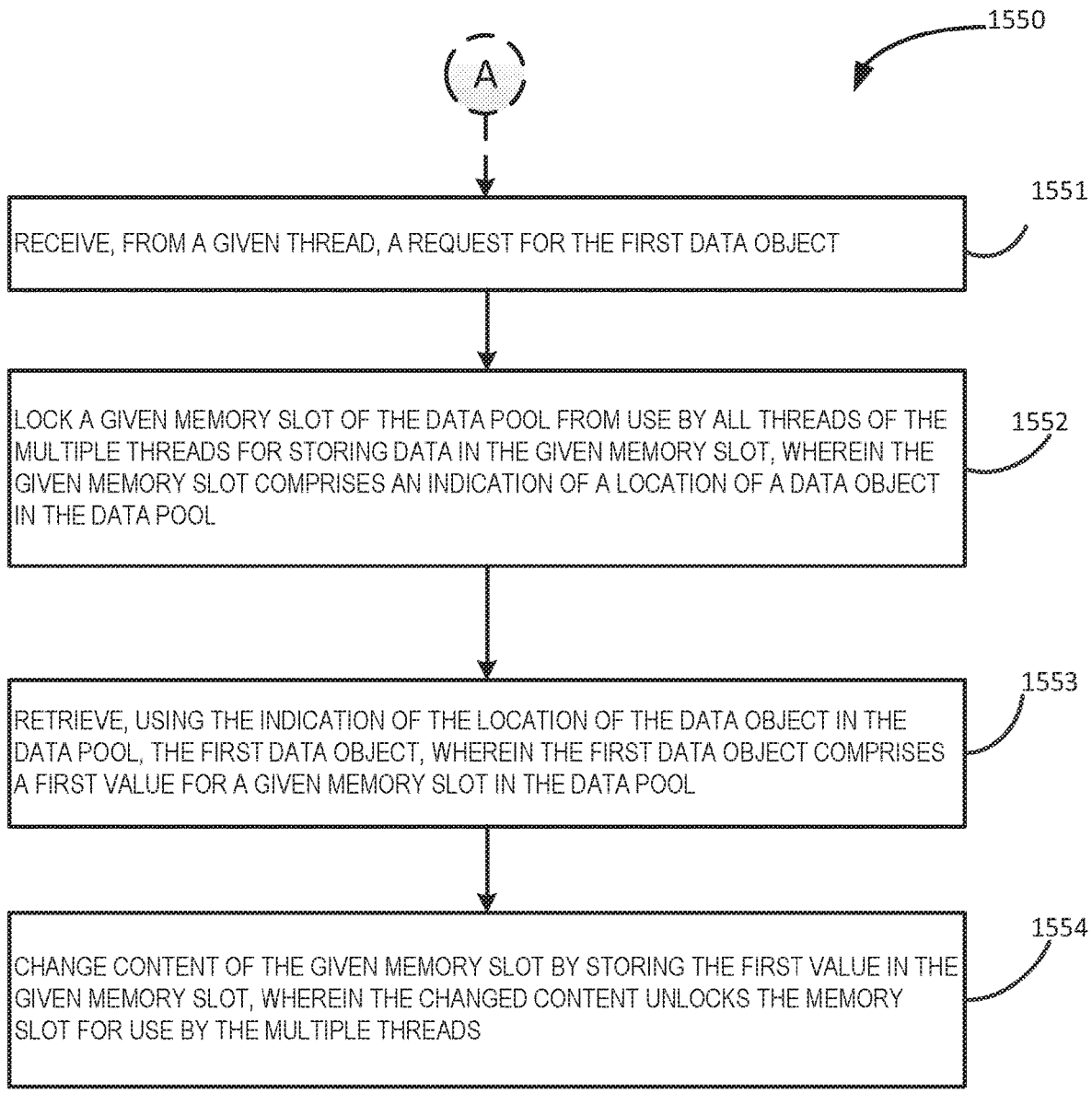
FIG. 15B illustrates a flow diagram for a method of retrieving a data object in a multi-slot data pool in at least one embodiment of the present technology.

In one or more embodiments, the computing system 1400 (e.g., pool manager 1460) implements a method as described herein (e.g., a method shown in FIG. 15A or FIG. 15B).

Figure 16A:
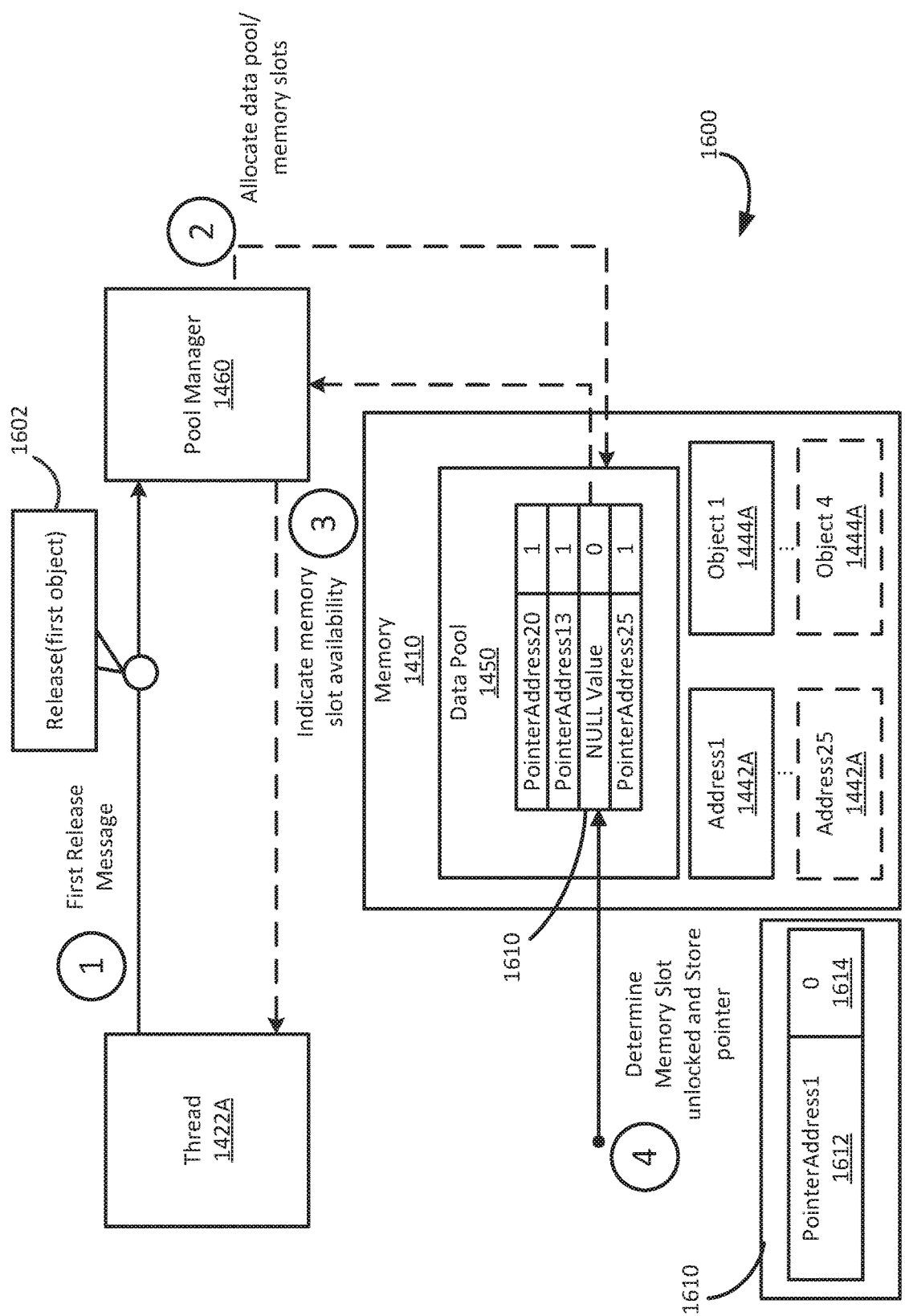
FIG. 16A illustrates an example flow diagram for storing an indication of a location of a data object in a multi-slot data pool in at least one embodiment of the present technology.

FIG. 15A illustrates a flow diagram for a method 1500 for storing an indication of a location of a data object in a multi-slot data pool (e.g., data pool 1450). FIG. 16A illustrates an example flow diagram 1600 for storing an indication of a location of a data object in a multi-slot data pool (e.g., according to the method 1500). The method 1500 illustrates an operation 1501 for receiving a first release message. The operation 1501 comprises receiving, from a first thread (e.g., thread 1422A) of an application with multiple threads, a first release message. The multiple threads indicate one or more operations on a memory associated with the application (e.g., application associated memory 1440). The first release message indicates that a first data object used by the first thread in one or more operations according to the first thread is released from use by the first thread. The first data object is stored in the memory associated with the application. For instance, as shown in flow diagram 1600 of FIG. 16A, the thread 1422A sends (1) a first release message 1602 to a pool manager 1460 releasing a first object 1444A.

As shown in FIG. 16A, the computing system 1400 may optionally responsive to the first release message, allocate (2) a preconfigured number of memory slots to the data pool 1450 in the memory associated with the application. This may happen when there is currently no data pool allocated or if the data pool is full or is anticipated to be full. Alternatively, or additionally, the data pool 1450 is allocated when a data object is first requested.

The computing system 1400 may optionally indicate a location of an allocated memory slot of the data pool 1450 (e.g., responsive to the first release message). For instance, the computing system may indicate the location of a memory slot that is unlocked.

The method 1500 of FIG. 15A illustrates an operation 1502 for indicating that a memory slot of a data pool is unlocked. The operation 1502 comprises indicating that a memory slot of a data pool is unlocked permitting storage of an indication of a location of the first data object in the memory associated with the application. The memory slot is one of a plurality of memory slots in the data pool. The data pool is in the memory associated with the application. Each memory slot of the data pool is individually lockable such that a respective locked memory slot of the data pool indicates storing a given data object's location in the respective locked memory slot will not be permitted even though storing the given data object's location in an unlocked memory slot of the data pool will be permitted. The indication that a memory slot of a data pool is unlocked may be responsive to the release message or may be provided prior to the release message.

For instance, as shown in FIG. 16A, the computing system 1400 may indicate (3) to the first thread that a memory slot of a data pool is unlocked by, indicating a location of a memory slot of the data pool (e.g., memory slot 1610 in data pool 1450).

Additionally, or alternatively, the computing device may indicate that the memory slot of the data pool is unlocked by providing a stored setting of an indicator associated with the memory slot of the data pool. The memory slot of the data pool can then be locked by changing the stored setting of the indicator associated with the memory slot of the data pool.

Alternatively, or additionally, the computing device may indicate that the memory slot of a data pool is unlocked by providing a status field of the memory slot (e.g., status indicator 1614 of memory slot 1610) indicating one of at least two statuses (or states) based on a value stored in the status field (e.g., one or more bits). A first status of the at least two statuses indicates the memory slot as locked or not available for reading. A second status of the at least two statuses indicates the memory slot is unlocked or available for reading. The computing device locks the memory slot of the data pool by changing the value of the status field. In one or more embodiments, the status field is a portion of a memory slot (e.g., the location indicator 1612 of memory slot 1610 could be in a separate field). Alternatively, the status field is the entirety of a memory slot (e.g., a memory slot 1610 comprising a location indicator 1612 and a status indicator 1614), in which there may be significantly more than two statuses (or states).

In one or more embodiments, a given field in a memory slot may include multiple bits. For instance, the status indicator 1614 may have additional states or bits to indicate whether the location address indicator 1612 has valid data (e.g., it points to a memory location or does not include a NULL value). That way the computing device can limit its reading of bits within the memory slot. Alternatively, or additionally, a given memory slot may have other fields such as a valid-data field or a type field to indicate a type or technique for finding the location of the object.

The method 1500 illustrates an operation 1503 for storing an indication of a location of the first data object. The operation 1503 comprises storing, in the memory slot of the data pool, an indication of a location of the first data object in the memory associated with the application. The first data object comprises the location of the memory slot of the data pool. For instance, as shown in FIG. 16A, the computing device in (4) determines that a memory slot is unlocked (because it has a 0 bit) and stores a pointer in the pointer address field. This may be consider a Push( ) operation similar to atomic stack processing in which the current point to object next is stored. However, unlike an atomic stack, the Push( ) processing can make progress if any of the entities are in an unlocked state. When storing, it is not necessary to activate the lock by a storing operation (e.g., a Push( ) operation) as the memory location can remain visible during storing.

As shown in this example, the other memory slots are locked. With a pool in place of a stack, the pool would allow for multiple atomic entries, and allow for progress to be made in the case of one of the entries being locked.

In this example shown in FIG. 16A, there is only one thread shown but the data pool 1450 may be configured for access by multiple threads. The chance a thread would hold a lock on a pool entry is mitigated by multiple lockable entities. The window for a thread to be context switched out is very small, usually a few machine instructions, but the cost for when this happens is high. Adding an array of lockable entities further reduces the chance of all entities being locked with threads that have been context switched and are not active.

The data pool 1450 may be configured for random access by the multiple threads of an application without regard to an order of memory slots of the plurality of memory slots. The computing device can randomly access a memory slot of the data pool 1450 to store the indication of the location of the first data object. The computing device can prevent access to all other threads of the multiple threads besides the first thread to the memory slot while the first thread is accessing the memory slot.

Figure 16B:
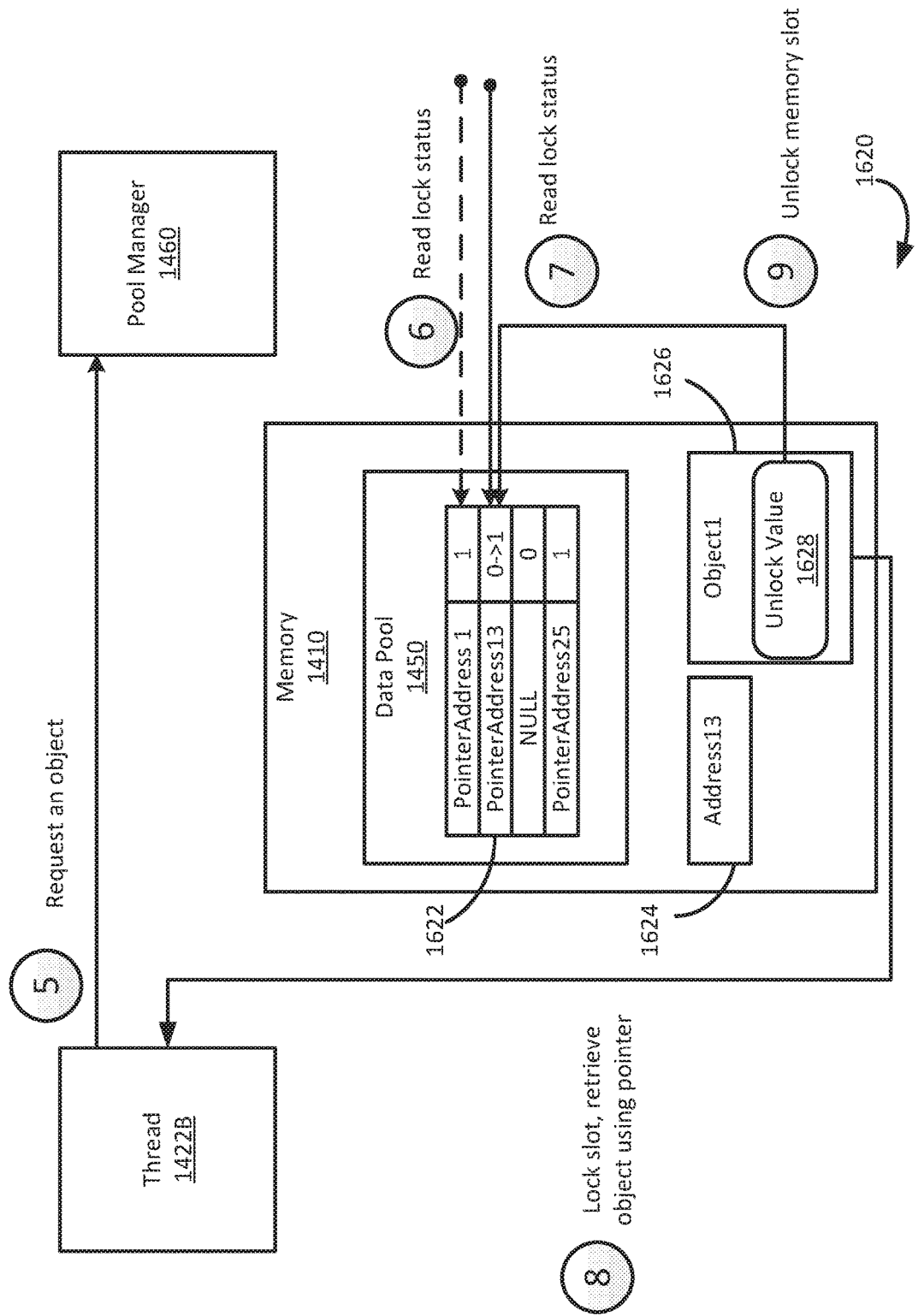
FIG. 16B illustrates an example flow diagram for retrieving a data object in at least one embodiment of the present technology.

FIG. 15B illustrates a flow diagram of a method 1550 for retrieving a data object in a multi-slot data pool. FIG. 16B illustrates an example flow diagram for retrieving a data object. The method 1550 may be used in conjunction with the method 1500 or separately from the method 1550. For example, the example in FIG. 16B follows the example in FIG. 16A. The method may be implemented by a computing device or system (e.g., computing system 1400).

The method 1550 illustrates an operation 1551 for receiving, from a given thread, a request for a first data object. As shown in FIG. 16B, the thread 1422B requests (5) an object of the computing device (e.g., pool manager 1460). Thread 1422B at the time of requesting may not know whether there is an object available because the thread is just requesting a previously released object.

In some embodiments, the computing device may read (6) one or more slots in the data pool 1450 before finding and reading (7) an unlocked slot. For instance, as shown a computing device checks a first slot and discovers that it is locked. Any order could be used to check the slots, and different orders could be used for different threads. For instance, a sequential or random method may be employed. Any unlocked entity in the data pool 1450 can be used to further progress towards retrieving an object.

The method 1550 illustrates an operation 1552 for locking a given memory slot 1622 of the data pool from use by all threads of the multiple threads for storing data in the given memory slot. The given memory slot comprises an indication of a location of a data object in the data pool. As shown in FIG. 16B, the status indicator changes from an unlocked state (0) to a locked state (1) to retrieve the data object. As explained with respect to FIG. 16A, different status indicators could be used (e.g., a locked state could be indicated with a 0 or a multibit status). The locking (8) ensures that the memory slot will not be visible to other threads during the operations to retrieve an object at the memory slot. Some implementations to protect the integrity of the data pool 1450 may restart processing if there is a failure to lock.

The method 1550 illustrates an operation 1553 for retrieving, using the indication of the location of the data object in the data pool, a released data object. The first data object comprises a first value for a given memory slot in the data pool. In the example shown in FIG. 16B, a pointer is used to point to the address location 1624 of the object 1626. The object comprises an unlock value 1628 which will be used to change the content of the memory slot.

The method 1550 illustrates an operation 1554 for changing content of the given memory slot by storing the first value in the given memory slot. The changed content unlocks the memory slot for use by the multiple threads. For instance, a Next Pointer may be obtained from an object and stored at a data memory slot location. This Next Point will have an unlocked status, thus unlocking the Memory slot.

In FIG. 16B, the data pool 1450 had objects at the time an object was requested. FIG. 16C illustrates a flow diagram 1640 for requesting an object when the data pool is empty. In this example shown in FIG. 16C, thread 1422C requests (10) an object, and the computing device (e.g., a pool manager 1460) checks (11) to see if the data pool 1450 has an indication of an available object. One challenge of the pool implementation is deciding when the underlying data pool 1450 is empty. If a single pass of all NULL is used, false NULL can occur if entries are locked and the locked entries are moved 'behind' the current entry under investigation (especially if a context switch occurs). This may be non-destructive if NULL is acceptable return from a routine to pop an object out of the data pool 1450 (i.e. a PoolPop( ) routine). A more aggressive implementation will spin for a SPIN_COUNT and only return NULL when the pool yields ZERO for all cycles of the SPIN. This adds the requirement that a NULL will 'cost' SPIN-CYCLE time for a NULL check, at the benefit of an almost ZERO chance of false NULLs. In this example, the empty counter 1642 may be used to count the spin cycles, and augments (12) the counter at each cycle. A counter could also be used to keep track of the objects in the pool.

It is possible that the data pool 1450 could receive a released object during the checking. For instance, the computing device could check each of the memory slots of the data pool 1450 and find no indication of a given object of the data pool 1450. The computing device could augment the value of a counter and check at least one of the memory slots again and find a given object of the data pool. The computing device could then indicate (13) that a memory slot of a data pool indicates a location for a release object.

In this example shown in FIG. 16C, if it is determined that the data pool is empty the computing device (e.g., a pool manager 1460) may indicate (13) the data pool is empty to the thread and the thread will need to request an allocation of an data object from an operating system. Additionally, or alternatively, the computing device may indicate to the operating system 1430 that that data pool is empty and that an object needs to be allocated.

Additionally, or alternatively, the thread may be a part of a ready-to-run queue 1644 of threads that are ready to perform operations on memory (e.g., application associated memory 1440). If the computing device indicates that all memory slots are in a particular state that is unsuitable to the thread operation (e.g., in this case the memory is empty), the thread may be transitioned to another end of the ready-to-run queue 1644.

Other threads of the multiple threads (e.g., threads 1422D-1422G) closer to the first end of the ready-to-run queue 1644 than the first thread 1422C will be processed ahead of the first thread 1422C. For instance, these threads could each be releasing an object and they could fill-up the data pool. When Thread 1422C reaches the first end of the ready-to-run queue 1644 again, the computing device could then indicate that the memory slot of the data pool is in another state (e.g., full).

Figure 16D:
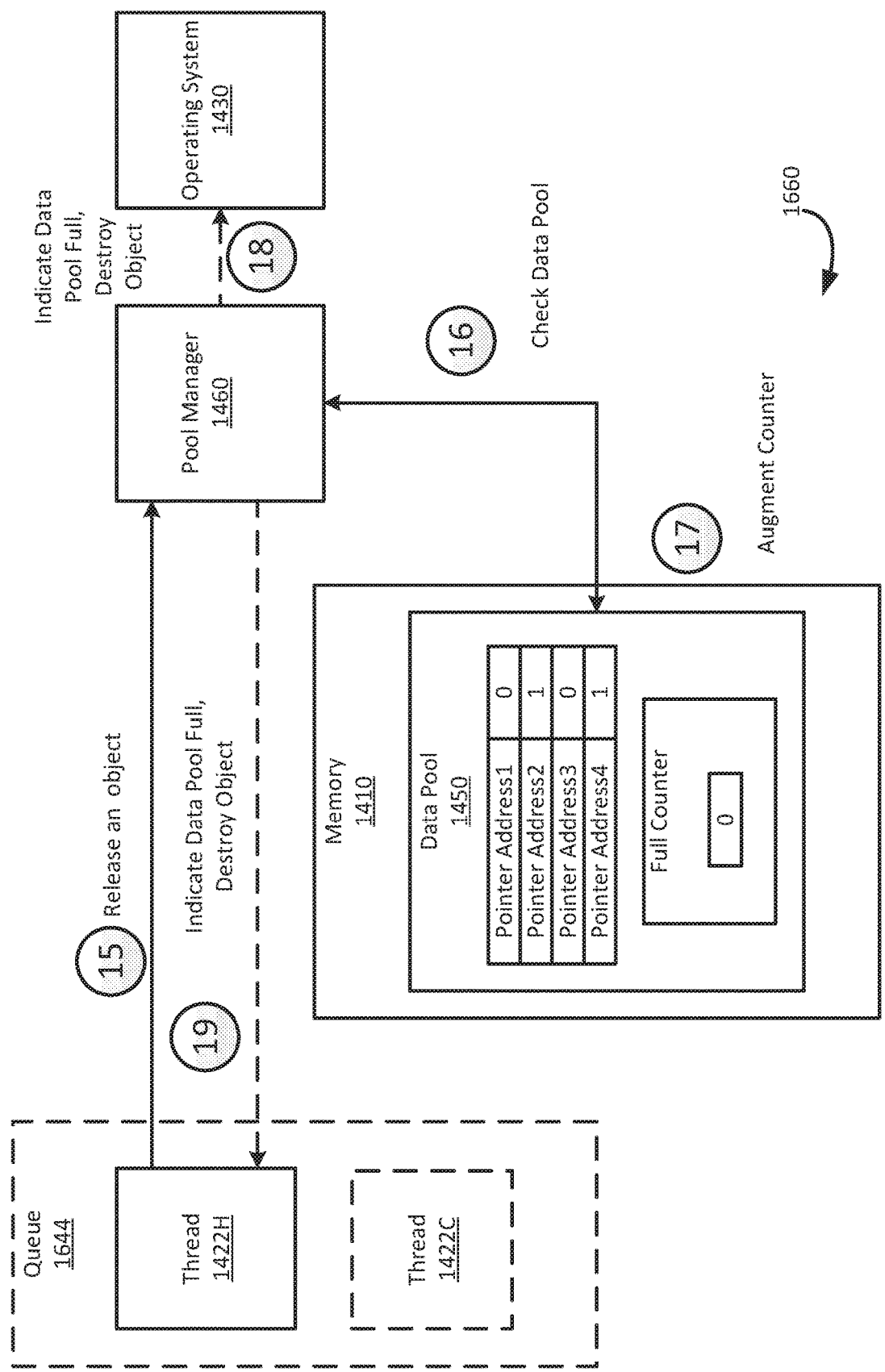
FIG. 16D illustrates an example flow diagram for releasing an object in at least one embodiment of the present technology.

FIG. 16D illustrates an example flow diagram 1660 for releasing an object in a scenario in which the data pool 1450 is full. As shown, the data pool 1450 comprises multiple indications of locations, each indicating different locations of different data objects allocated in response to operations of different threads of the multiple threads.

The thread 1422D sends (15) a request to release a data object (e.g., a second data object). The computing device (e.g., a pool manager 1460 of computing system 1400) receives the request and checks (16) the data pool 1450.

In this case, the computing device could indicate (19) the data pool 1450 is full and the object needs to be destroyed. Thread 1422H could be transitioned to the end of queue 1644 and thread 1422C that has made it to the top again can finally get an object.

Alternatively, or additionally the computing device may use a counter to search the data pool multiple times before indicating the data pool is full, and augment (17) the counter for each check or use a full counter to keep track of the objects. There could, but does not have to be, an upper limit for objects that can be stored in the data pool 1450. The upper limit could be set by the computing device based on criteria such as the type of application.

The computing device may set a value for a counter for searching for a memory slot of the data pool 1450 that does not indicate the location of an object of one or more objects. The computing device could check each of memory slots of the data pool and find a given memory slot of the data pool either locked (i.e. status of 1 in this example) or with data indicating a respective object of the one or more objects (e.g., pointers to addresses). If an object were popped out of the data pool during this time, the computing device may indicate a memory slot is unlocked and ready to index a released object by checking at least one of the memory slots of the data pool again and finding one of the memory slots of the data pool unlocked and not indicating the location of a given object of the one or more objects.

Figure 17:
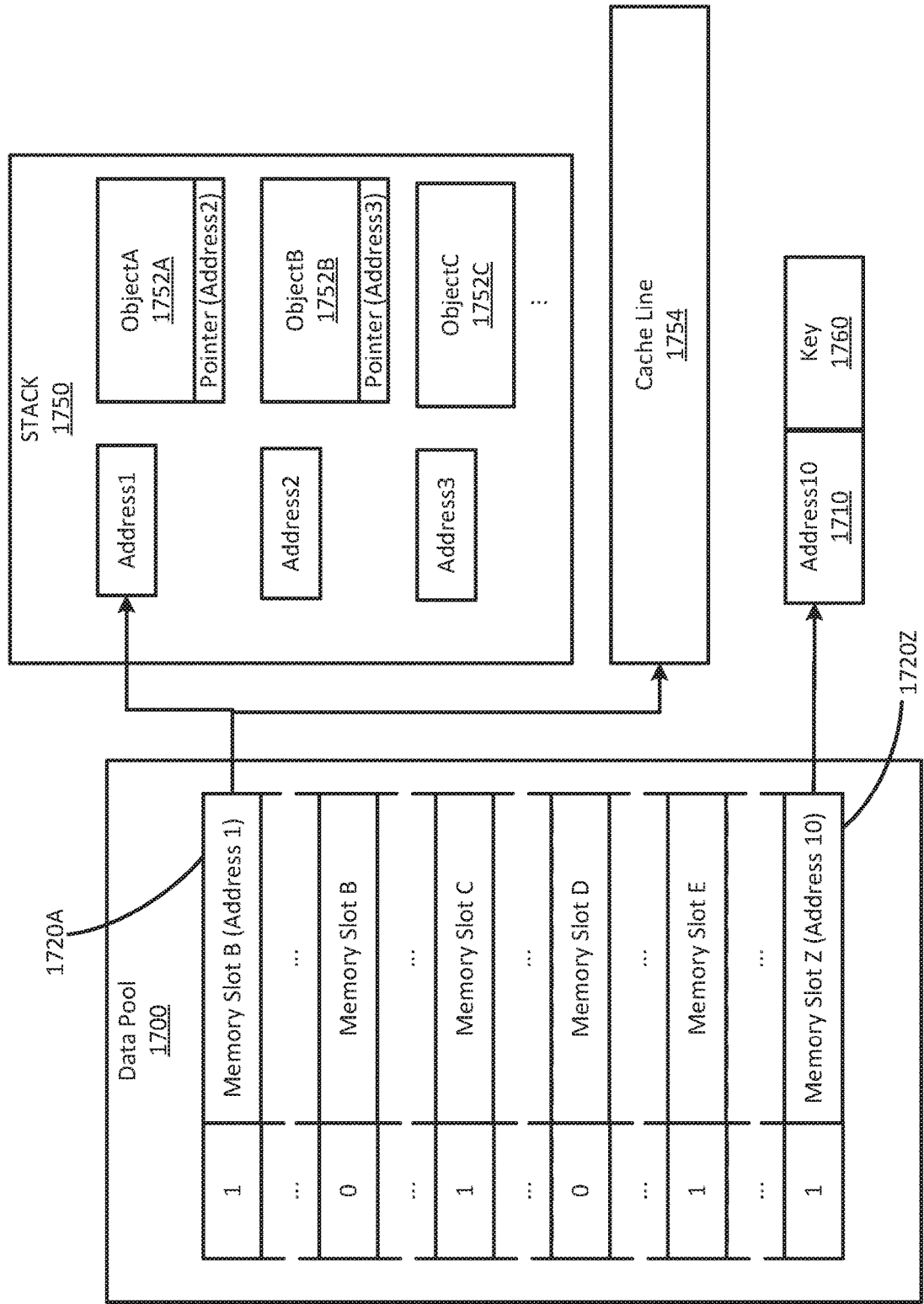
FIG. 17 illustrates example data pool schemes in at least one embodiment of the present technology.

Previous examples where shown in the context of a data pool with four memory slots merely for illustration. The data pool could have more or less memory slots. FIG. 17 illustrates example data pool scheme 1700 that comprises more than four memory slots 1720. Memory slots in a data pool in embodiments herein could be located contiguously or noncontiguously in memory (e.g., in application associated memory 1440).

In one or more embodiments, a computing device stores an indication of a location of a released object by storing, in the memory slot, an indication of a pathway or technique to find the location of the first data object. A data pool implementation can include stacks where a memory slot indicates a pointer to a top of a stack. For instance, memory slot 1720A indicates an address location of a top of stack 1750. The atomic stack 1750 can store data objects in memory elements 1752 using pointers to indicate a next object in the stack. When a thread is accessing the stack 1750, access is prevented to all data objects in the stack by all other threads. Memory slot 1720Z references an address location 1710 where a key 1760 (e.g., a hash key) is stored for identifying a storage location for an object.

In one or more embodiments, a memory slot is associated with other memory (e.g., a reserved cache line in a central processing unit or CPU for example). For example, in a 32-bit system, the memory slot may have 4 bytes of memory and be associated with 32 bytes of cache line. More or less memory space may be possible (e.g., in a 64-bit system, there may be 8 bytes of memory).

FIG. 18 illustrates tables showing relative data processing improvements for using an atomic stack compared to an atomic pool method described in embodiments herein. In contrast to pool methods described herein, in this atomic stack implementation the least-significant bits (lsb) of the structure pointer to the top of the stack (TOS) is used as the 'lock' bit. This is accomplished because memory allocation is aligned on greater than 8 byte boundaries (usually 16 bytes). This memory allocation leaves the least-significant bits available for attributes; in this case 'locked'. This implementation uses improvements to achieve maximum throughput including to spin over the Read operation instead of the Compare-Exchange atomic instruction used to set a new value. This approach prevents a CACHE LINE WRITE (even unchanged) which will require a CACHE LINE READ for the next access. The Read operation will leave the CACHE line alone, until there is truly a change. Further, improvements include to add an Operating System Yield call after a spin-count has been achieved to suspend a thread holding a lock. When locked, other threads cannot make further progress towards the goal of registering its object into the underlying data store.

When the TOS is unlocked (lsb unset), processing to establish the new top of stack can begin. This is done by first grabbing the current TOS value and storing it in the thread Object that is being pushed onto the top of the stack. This can proceed unlocked as the Object does not have global visibility, it is only seen by the thread performing the Push( ) operation. The final operation StackPop( ) to push the object on to the TOS is to set the TOS to point to the new Object (unlocked). This SWAP operation will fail if the TOS has been modified with a new value or is locked. In either case, a failure restarts the Push( ) operation. Push( ) operation requires locking the TOS. Locking stack protects the integrity of the stack object. Without this protection, the stack can be corrupt as multiple threads will have visibility to the TOS object as the atomic operations only operate on integer operations. If the operation to lock the Stack fails, the operation is restarted. Using a PoolPush( ) operation, once the TOS has been locked the next TOS can then be safely extracted from the TOS-Object. It will always be unlocked, so a simple save to TOS will update the pointer and clear the Lock.

Each table records the outcome of a comparison tests for a stack method compared to variants of the pool method, which differ in the number of slots in the pool and the duration that the spin method will run before a yield function will be used. The pool method in Tables 1800 and 1820, for example, uses a two-slot pool while the pool method in Tables 1840 and 1860 uses a pool with four slots. Table 1800 tests spin 92(0x5c in hexadecimal) times before yielding; tables 1820 and 1840 tests spin 44(0x2c in hexadecimal) times before yielding; and table 1860 tests spin 12(0x0c in hexadecimal) times before yielding. Each table represents a series of tests performed with increasing number of threads executing different numbers of iterations of code per second as shown in execution columns 1810, 1830, 1850, and 1870. The tests ran both the stack and pool methods contemporaneously on a 12-core platform. The number of iterations per second achieved by the stack method is shown in stack columns 1812, 1832, 1852 and 1872. The number of iterations per second achieved by the pool method is shown in pool columns 1814, 1834, 1854 and 1874. Comparison columns 1816, 1836, 1856, and 1876 shows a normalized increase or decrease of iterations per second of the slot method compared to the stack method as a percentage according to the equation below. The number of iterations per second should increase with the pool method because threads are not having to wait as often to retrieve a data object, which would result in a positive improvement.

$$\text{Improvement } (\%) = \frac{\text{\# of Iterations/sec of Pool} - \text{\# of Iterations/sec of Stack}}{\text{Number of Iterations/sec of Stack}} * 100$$

The results show the improvement of the pool method over the slot method when more than a single thread is used. The highest improvements were achieved with a pool method using a data pool with more slots. For instance, as shown in entry 1880, the stack method was able to achieve a speed of 2,865,965.9 iterations per second while the pool method (utilizing a pool of four slots and spin(0x0c)) was able to achieve 9,670,016.43 iterations per second. These were the speeds achieved when running 10,000,000 iterations per method using 32 threads. The pool method showed an improvement of 237.41% over the stack method. There was only a slight negative performance shown in the tables 1800, 1820, 1840, and 1860, when a single thread was used. This was likely due to additional processing needed for checking multiple slots. The results also show that the best results achieve a balance between the number of threads for a data pool. For instance, each of the tables showed a slight reduction in improvement when there were 64 threads who were trying to access the slots compared to 33 slots. Reducing the number of spins before yielding also tended to improve performance of the pool method.

Previous approaches to improving operation of the atomic stack (e.g., using a Yield ( ) optimization, did not address the problem: chiefly, that the thread could not make further progress towards the goal of registering its object into the underlying data store. This is a result of a thread attempting to set the lock on the top-of-stack while the thread that has the lock has context switched out. Embodiments herein provide an improved ability to have multiple "locations" (pooling) to store temporary items to decrease the chances of contention and increase the overall system performance. These advantages show the potential for large improvements in processing capabilities as demonstrated by performance tests in FIG. 18.

What is claimed is:

1. A computer-program product tangibly embodied in a non-transitory machine-readable storage medium, the computer-program product including instructions operable to cause a computing device to:
   receive, by a pool manager of a data pool, from a first thread of an application with multiple threads, a first release indication, wherein:
      each of the multiple threads indicates one or more operations on a first region of memory associated with the application;
      the first release indication indicates that a first data object used by the first thread in the one or more operations is released from use by the first thread for the pool manager to retain or destroy the first data object for use by the application;
      the first data object, released from use by the first thread, is stored at a location addressed in the first region of the memory associated with the application;
      the data pool is in a second region of the memory associated with the application, wherein the second region is addressed with different addresses than the first region;
      the data pool comprises a plurality of memory slots in the second region for storing respective address content indicating a respective location, wherein the respective location addresses a respective object in the first region, and wherein each respective memory slot of the data pool comprises a respective lock indicator that indicates one of two statuses that is a status for the respective memory slot irrespective of a status of any other memory slot of the data pool; and
      the plurality of memory slots comprise a first memory slot that is restricted to a structure of less than or equal to 8 bytes for storing the respective address content of the respective object in the first region and indicating the respective lock indicator;
   indicate that the first memory slot of the data pool is in an unlocked status of the two statuses permitting storage of the respective address content, wherein the two statuses comprise:
      a locked status for an associated locked memory slot that indicates:
         the associated locked memory slot is not available for a given thread of the multiple threads to read the respective address content from the associated locked memory slot, and
         the associated locked memory slot is not available for the given thread of the multiple threads to write the respective address content to the associated locked memory slot; and
      the unlocked status for an associated unlocked memory slot that indicates:
         the associated unlocked memory slot is available for the given thread of the multiple threads to read the respective address content from the associated locked memory slot, and
         the associated unlocked memory slot is available for the given thread of the multiple threads to write the respective address content to the associated locked memory slot; and
   refrain from destroying the first data object for use by the application such that the first data object is available for use by one or more of the multiple threads other than the first thread, wherein the computing device refrains from destroying the first data object for use by:
      storing, while the first memory slot remains in the unlocked status, as the respective address content in the first memory slot of the data pool, a pointer to an address of a location of the first data object released by the first thread; and
      modifying the first data object to reference a location, in the second region, of the first memory slot of the data pool.

2. The computer-program product of claim 1, wherein each memory slot of the data pool is individually lockable by changing a stored setting of the respective lock indicator associated with a respective memory slot of the data pool; and
   wherein the instructions are operable to cause the computing device to indicate that the first memory slot is in the unlocked status based on a respective stored setting of the respective lock indicator for the first memory slot without regard to a status of any other memory slot or status of the data pool.

3. The computer-program product of claim 1, wherein the instructions are operable to cause the computing device to:
   receive, from a given thread of the multiple threads, a request for a given data object;
   change a given lock indicator associated with a given memory slot of the data pool to the locked status, wherein the given memory slot comprises an indication of a location of the given data object in the data pool;
   retrieve, using the indication of the location of the given data object in the data pool, the first data object, wherein the first data object comprises a first value for a given memory slot in the data pool; and
   change content of the given memory slot by storing the first value in the given memory slot, wherein the storing the content changes the given lock indicator from the locked status to the unlocked status.

4. The computer-program product of claim 3, wherein the instructions are operable to cause the computing device to:

receive a request from a second thread of the multiple threads for another data object; and indicate that the data pool is empty and the second thread will need to request an allocation of a new data object from an operating system of the computing device.

5. The computer-program product of claim 3, wherein the instructions are operable to cause the computing device to:

receive a request from a second thread of the multiple threads for another data object; and set a value for a counter for searching for an indication of an available object of the data pool; and indicate that a memory slot of the data pool indicates a location for the another data object by:

checking each of the memory slots of the data pool and finding no indication of the available object of the data pool;

augmenting the value of the counter; and checking at least one of the memory slots again and finding the available object of the data pool; and retrieve the available object of the data pool for the second thread.

6. The computer-program product of claim 1, wherein the instructions are operable to cause the computing device to indicate to the first thread that the first memory slot of the data pool is in the unlocked status by:

responsive to the first release indication, allocating a preconfigured number of memory slots to the data pool in the memory associated with the application, wherein the amount of bits of each of the preconfigured number of the memory slots that can be allocated is preconfigured to be equal to or less than 8 bytes based on an operating system or cache line constraint of the computing device; and indicating a location of an allocated memory slot of the data pool.

7. The computer-program product of claim 6, wherein the allocating comprises allocating at least four memory slots of the plurality of memory slots, wherein the at least four memory slots are located contiguously in a region of the memory associated with the application.

8. The computer-program product of claim 6, wherein the allocating comprises allocating at least four memory slots of the plurality of memory slots, wherein the at least four memory slots are located noncontiguously in a region of the memory associated with the application.

9. The computer-program product of claim 1, wherein the data pool is configured for random access by the multiple threads of the application without regard to an order of memory slots of the plurality of memory slots and without regard to the respective lock indicator of the respective memory slot of the data pool; and wherein the computing device is configured to:

randomly access the memory slot of the data pool to store the pointer to the address of the location of the first data object released by the first thread; and prevent access to active threads of the multiple threads besides the first thread to the memory slot while the first thread is accessing the memory slot and the active threads remain in an active state.

10. The computer-program product of claim 1, wherein the instructions are operable to cause the computing device to:

set a value for a counter for searching for a memory slot of the data pool that does not indicate a location; and indicate that a memory slot of a data pool is in the unlocked status by:

checking each of memory slots of the data pool and finding a given memory slot of the data pool either in the locked status or with data indicating a respective object of one or more objects;

augmenting the value of the counter; and checking at least one of the memory slots of the data pool again and finding one of the memory slots of the data pool in the unlocked status and not indicating the location of a given object of the one or more objects.

11. The computer-program product of claim 1, wherein the instructions are operable to cause the computing device to:

receive a second release indication from a second thread of the multiple threads for a second data object;

indicate that the data pool is full and that the second data object will need to be destroyed for access by the application; and destroy the second data object for use by the application.

12. The computer-program product of claim 1, wherein the computing device queues active threads of the multiple threads that are ready to perform operations on the memory associated with the application in a ready-to-run queue with a first end and a second end; and wherein the instructions are operable to cause the computing device to:

when the first thread is at the first end of the ready-to-run queue, indicate to the first thread that all memory slots of the plurality of memory slots in the data pool are in a first one of the two statuses;

transition the first thread to the second end of the ready-to-run queue, wherein other active threads of the multiple threads closer to the first end of the ready-to-run queue than the first thread will be processed ahead of the first thread; and when the first thread reaches the first end of the ready-to-run queue again, indicate to the first thread that the memory slot of the data pool is in a second one of the two statuses.

13. The computer-program product of claim 1, wherein one bit of the structure of the first memory slot indicates the respective lock indicator, and one or more other bits of the structure indicate the pointer.

14. The computer-program product of claim 1, wherein the instructions are operable to cause the computing device to store the pointer to the address of the location of the first data object by storing, in the memory slot, an indication of a pathway or technique to identify the address of the first data object.

15. The computer-program product of claim 1, wherein one or more of the plurality of memory slots in the data pool is a respective top of a respective atomic stack of memory slots for a respective memory slot of the data pool; and wherein the instructions are operable to cause the computing device to, when the respective top of the respective stack of the memory slots for the respective memory slot of the data pool is being accessed by a given thread of the multiple threads, prevent access to all data objects in the respective stack by all other threads of the multiple threads besides the given thread.

16. The computer-program product of claim 1, wherein the application comprises operations defined in a data object-oriented programming language, and wherein the first data object is allocated by an operating system of the computing device in response to execution of a data object-oriented program.

17. The computer-program product of claim 16, wherein the instructions are operable to cause the computing device to:
   set a value for a counter for searching for a memory slot of the data pool that does not indicate a location;
   indicate that a memory slot of a data pool is in the unlocked status by:
      checking each of memory slots of the data pool and finding a given memory slot of the data pool either in the locked status or with data indicating a respective object of one or more objects;
      augmenting the value of the counter; and
      checking at least one of the memory slots of the data pool again and finding one of the memory slots of the data pool in the unlocked status and not indicating the location of a given object of the one or more objects;
   receive a second release indication from a second thread of the multiple threads for a second data object; and
   indicate that the data pool is full and that the second data object will need to be destroyed for use by the application.

18. The computer-program product of claim 16, wherein the instructions are operable to cause the computing device to:
   set a value for a counter for searching for a memory slot of the data pool that does not indicate a location;
   indicate that a memory slot of a data pool is in the unlocked status by:
      checking each of memory slots of the data pool and finding a given memory slot of the data pool either in the locked status or with data indicating a respective object of one or more objects;
      augmenting the value of the counter; and
      checking at least one of the memory slots of the data pool again and finding one of the memory slots of the data pool in the unlocked status and not indicating the location of a given object of the one or more objects;
   receive a request from a second thread of the multiple threads for another data object; and
   indicate that the data pool is empty and the second thread will need to request an allocation of a new data object from an operating system.

19. The computer-program product of claim 1,
   wherein the data pool comprises a second memory slot that is less than or equal to 8 bytes and the second memory slot comprises an indication of the locked status; and
   wherein the instructions are operable to cause the computing device to: refrain from destroying the first data object for use by the application by the storing in the first memory slot, while the first memory slot remains in the unlocked status and the second memory slot remains in the locked status.

20. The computer-program product of claim 1, wherein the instructions are operable to cause the computing device to:
   receive, from a given thread of the multiple threads, a request for a given data object;
   change a given lock indicator associated with a given memory slot of the data pool to the locked status, wherein the given memory slot comprises an indication of a location of the given data object in the data pool;
   prevent access, by at least one thread of the multiple threads, to the given memory slot, while keeping the thread in an active state such that it will not go to sleep to await access to the given memory slot or other memory slots of the data pool; and
   retrieve, using the indication of the location of the given data object in the data pool, the first data object, wherein the first data object comprises a first value for a given memory slot in the data pool.

21. The computer-program product of claim 1, wherein the first region of the memory associated with the application comprises a plurality of reserved cache lines in a central processing unit of the computing device, and wherein each of the memory slots of the data pool are restricted to equal to or less than 8 bytes for addressing an ad hoc cache line of the plurality of cache lines.

22. The computer-program product of claim 1, wherein the computing device comprises a 32-bit or 64-bit operating system and when each of the memory slots of the data pool are restricted to 8 bytes or less based on how much memory a processor of the computing system can access according to the 32-bit or 64-bit operating system.

23. The computer-program product of claim 1, wherein the computing device receives the first release indication according to a push operation performed for the first thread to push the pointer to the address of the location of the first data object into the data pool.

24. A computer-implemented method comprising:
   receiving, by a pool manager of a data pool, from a first thread of an application with multiple threads, a first release indication, wherein:
      each of the multiple threads indicates one or more operations on a first region of memory associated with the application;
      the first release indication indicates that a first data object used by the first thread in the one or more operations is released from use by the first thread for the pool manager to retain or destroy the first data object for use by the application;
      the first data object, released from use by the first thread, is stored at a location addressed in the first region of the memory associated with the application;
      the data pool is in a second region of the memory associated with the application, wherein the second region is addressed with different addresses than the first region;
      the data pool comprises a plurality of memory slots in the second region for storing respective address content indicating a respective location, wherein the respective location addresses a respective object in the first region, and wherein each respective memory slot of the data pool comprises a respective lock indicator that indicates one of two statuses that is a status for the respective memory slot irrespective of a status of any other memory slot of the data pool; and
      the plurality of memory slots comprise a first memory slot that is restricted to a structure of less than or equal to 8 bytes for storing the respective address content of the respective object in the first region and indicating the respective lock indicator;
   indicating that the first memory slot of the data pool is in an unlocked status of the two statuses permitting storage of the respective address content, wherein the two statuses comprise:

a locked status for an associated locked memory slot that indicates:
the associated locked memory slot is not available for a given thread of the multiple threads to read the respective address content from the associated locked memory slot, and
the associated locked memory slot is not available for the given thread of the multiple threads to write the respective address content to the associated locked memory slot; and
the unlocked status for an associated unlocked memory slot that indicates:
the associated unlocked memory slot is available for the given thread of the multiple threads to read the respective address content from the associated locked memory slot, and
the associated unlocked memory slot is available for the given thread of the multiple threads to write the respective address content to the associated locked memory slot; and
refrain from destroying the first data object for use by the application such that the first data object is available for use by one or more of the multiple threads other than the first thread, wherein a computing device refrains from destroying the first data object for use by:
storing, while the first memory slot remains in the unlocked status, as the respective address content in the first memory slot of the data pool, a pointer to an address of a location of the first data object released by the first thread; and
modifying the first data object to reference a location, in the second region, of the first memory slot of the data pool.

25. The computer-implemented method of claim 24,
wherein each memory slot of the data pool is individually lockable by changing a stored setting of the respective lock indicator associated with a respective memory slot of the data pool; and
wherein the indicating that the first memory slot is in the unlocked status comprises indicating based on a respective stored setting of the respective lock indicator for the first memory slot without regard to a status of any other memory slot or status of the data pool.

26. The computer-implemented method of claim 24,
wherein one bit of the structure of the first memory slot indicates the respective lock indicator, and one or more bits of the structure indicate the pointer.

27. The computer-implemented method of claim 24, further comprising:
receiving, from a given thread of the multiple threads, a request for a given data object;
changing a given lock indicator associated with a given memory slot of the data pool to the locked status, wherein the given memory slot comprises an indication of a location of the given data object in the data pool;
retrieving, using the indication of the location of the given data object in the data pool, the first data object, wherein the first data object comprises a first value for a given memory slot in the data pool; and
changing content of the given memory slot by storing the first value in the given memory slot, wherein the storing the content changes the given lock indicator from the locked status to the unlocked status.

28. The computer-implemented method of claim 27, further comprising:
receiving a request from a second thread of the multiple threads for another data object; and indicating that the data pool is empty and the second thread will need to request an allocation of a new data object from an operating system.

29. The computer-implemented method of claim 27, further comprising:
receiving a request from a second thread of the multiple threads for another data object; and
setting a value for a counter for searching for an indication of an available object of the data pool; and
indicating that a memory slot of a data pool indicates a location for the another data object by:
checking each of the memory slots of the data pool and finding no indication of the available object of the data pool;
augmenting the value of the counter; and
checking at least one of the memory slots again and finding the available object of the data pool; and
retrieve the available object of the data pool for the second thread.

30. The computer-implemented method of claim 24, wherein the indicating that the first memory slot of the data pool is in the unlocked status comprises:
responsive to the first release indication, allocating a preconfigured number of memory slots to the data pool in the memory associated with the application, wherein the amount of bits of each of the preconfigured number of the memory slots that can be allocated is preconfigured to be equal to or less than 8 bytes based on an operating system or cache line constraint; and
indicating a location of an allocated memory slot of the data pool.

31. The computer-implemented method of claim 24, further comprising:
setting a value for a counter for searching for a memory slot of the data pool that does not indicate a location; and
indicating that a memory slot of a data pool is unlocked by:
checking each of memory slots of the data pool and finding a given memory slot of the data pool either in the locked status or with data indicating a respective object of one or more objects;
augmenting the value of the counter; and
checking at least one of the memory slots of the data pool again and finding one of the memory slots of the data pool in the unlocked status and not indicating the location of a given object of the one or more objects.

32. The computer-implemented method of claim 24, further comprising:
receiving a second release indication from a second thread of the multiple threads for a second data object;
indicating that the data pool is full and that the second data object will need to be destroyed for access by the application; and
destroy the second data object for use by the application.

33. The computer-implemented method of claim 24,
wherein active threads of the multiple threads that are ready to perform operations on the memory associated with the application are queued in a ready-to-run queue with a first end and a second end; and
wherein the indicating that the memory slot of the data pool is unlocked comprises:
when the first thread is at the first end of the ready-to-run queue, indicating to the first thread that all memory slots of the plurality of memory slots in the data pool are in a first one of the two statuses;

transitioning the first thread to the second end of the ready-to-run queue, wherein other active threads of the multiple threads closer to the first end of the ready-to-run queue than the first thread will be processed ahead of the first thread; and when the first thread reaches the first end of the ready-to-run queue again, indicating to the first thread that the memory slot of the data pool is in a second one of the two statuses.

34. A computing device comprising a processor and memory, the memory containing instructions executable by the processor wherein the computing device is configured to:

receive, by a pool manager of a data pool, from a first thread of an application with multiple threads, a first release indication, wherein:

each of the multiple threads indicates one or more operations on a first region of memory associated with the application;

the first release indication indicates that a first data object used by the first thread in the one or more operations is released from use by the first thread for the pool manager to retain or destroy the first data object for use by the application;

the first data object, released from use by the first thread, is stored at a location addressed in the first region of the memory associated with the application;

the data pool is in a second region of the memory associated with the application, wherein the second region is addressed with different addresses than the first region;

the data pool comprises a plurality of memory slots in the second region for storing respective address content indicating a respective location, wherein the respective location addresses a respective object in the first region, and wherein each respective memory slot of the data pool comprises a respective lock indicator that indicates one of two statuses that is a status for the respective memory slot irrespective of a status of any other memory slot of the data pool; and the plurality of memory slots comprise a first memory slot that is restricted to a structure of less than or equal to 8 bytes for storing the respective address content of the respective object in the first region and indicating the respective lock indicator;

indicate that the first memory slot of the data pool is in an unlocked status of the two statuses permitting storage of the respective address content, wherein the two statuses comprise:

a locked status for an associated locked memory slot that indicates:

the associated locked memory slot is not available for a given thread of the multiple threads to read the respective address content from the associated locked memory slot, and the associated locked memory slot is not available for the given thread of the multiple threads to write the respective address content to the associated locked memory slot; and the unlocked status for an associated unlocked memory slot that indicates:

the associated unlocked memory slot is available for the given thread of the multiple threads to read the respective address content from the associated locked memory slot, and the associated unlocked memory slot is available for the given thread of the multiple threads to write the respective address content to the associated locked memory slot; and refrain from destroying the first data object for use by the application such that the first data object is available for use by one or more of the multiple threads other than the first thread, wherein the computing device refrains from destroying the first data object for use by:

storing, while the first memory slot remains in the unlocked status, as the respective address content in the first memory slot of the data pool, a pointer to an address of a location of the first data object released by the first thread; and modifying the first data object to reference a location, in the second region, of the first memory slot of the data pool.

* * * * *